(12) United States Patent
Shiraishi

(10) Patent No.: US 8,144,216 B2
(45) Date of Patent: Mar. 27, 2012

(54) IMAGING APPARATUS AND IMAGING METHOD

(75) Inventor: Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 286 days.

(21) Appl. No.: 12/652,515

(22) Filed: Jan. 5, 2010

(65) Prior Publication Data

US 2010/0171842 A1    Jul. 8, 2010

(30) Foreign Application Priority Data

Jan. 7, 2009   (JP) ................................. 2009-001669

(51) Int. Cl.
*H04N 5/235*    (2006.01)
*H04N 9/73*    (2006.01)

(52) U.S. Cl. .................................. 348/229.1; 348/224.1
(58) Field of Classification Search ............... 348/229.1, 348/224.1
See application file for complete search history.

(56) References Cited

U.S. PATENT DOCUMENTS

| | | | |
|---|---|---|---|
| 6,809,761 B1 * | 10/2004 | Tamaru | 348/229.1 |
| 7,397,502 B2 | 7/2008 | Shiraishi | |
| 7,471,321 B2 | 12/2008 | Ojima et al. | |
| 7,573,509 B2 | 8/2009 | Shiraishi | |
| 7,589,782 B2 | 9/2009 | Shiraishi et al. | |
| 7,598,997 B2 | 10/2009 | Shiraishi | |
| 2005/0062854 A1 | 3/2005 | Shiraishi | |
| 2005/0134700 A1 | 6/2005 | Shiraishi | |
| 2005/0151874 A1 | 7/2005 | Shiraishi | |
| 2006/0192878 A1 * | 8/2006 | Miyahara et al. | 348/333.01 |
| 2007/0216951 A1 | 9/2007 | Shiraishi | |
| 2009/0047010 A1 | 2/2009 | Yoshida et al. | |
| 2009/0073282 A1 | 3/2009 | Yamada et al. | |
| 2009/0115869 A1 | 5/2009 | Ojima et al. | |
| 2009/0141152 A1 | 6/2009 | Ojima et al. | |
| 2009/0180000 A1 | 7/2009 | Shiraishi | |

FOREIGN PATENT DOCUMENTS

JP      10-262182 A     9/1998
JP      2000-92378 A    3/2000

* cited by examiner

*Primary Examiner* — James Hannett
(74) *Attorney, Agent, or Firm* — Dickstein Shapiro LLP

(57) ABSTRACT

An imaging apparatus includes: an image sensor; a pixel output judging processor which judges that at least one of a pixel output of a pixel of a specific color and a pixel output of a pixel of a color other than the specific color in the vicinity of the pixel of the specific color reaches a predetermined judging level; a pixel output compensation processor which compensates the pixel output of the pixel of the specific color; and a bit compression convertor which performs a bit compression such that pixel output data which is once converted from a first bit number to a second bit number is converted into the first bit number, wherein the bit compression convertor performs the bit compression on the pixel output data per segment based on a bit compression characteristic respectively set in accordance with the calculated pixel output distribution per segment.

16 Claims, 13 Drawing Sheets

FIG. 10A
FIG. 10B
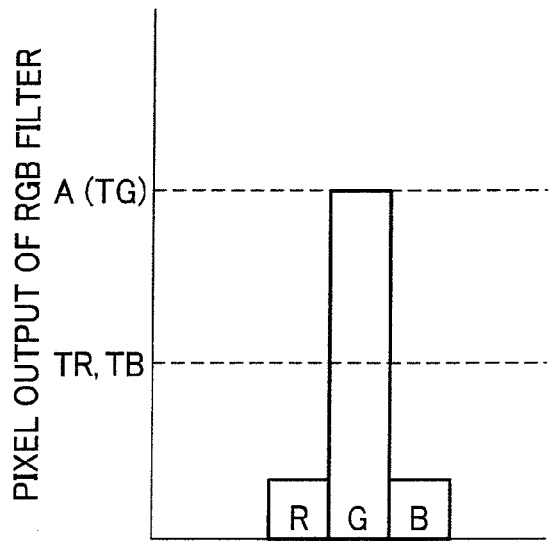
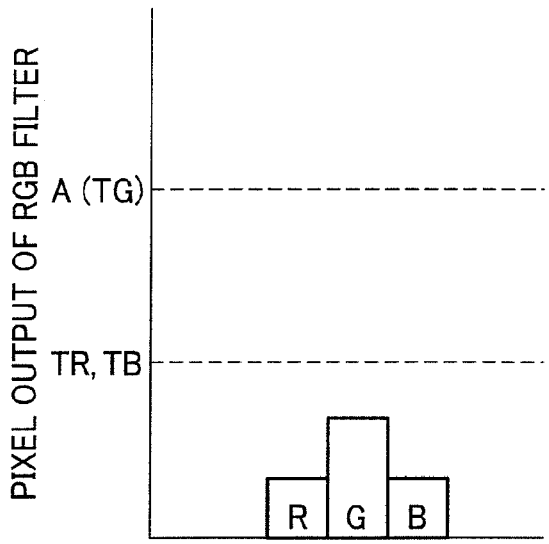

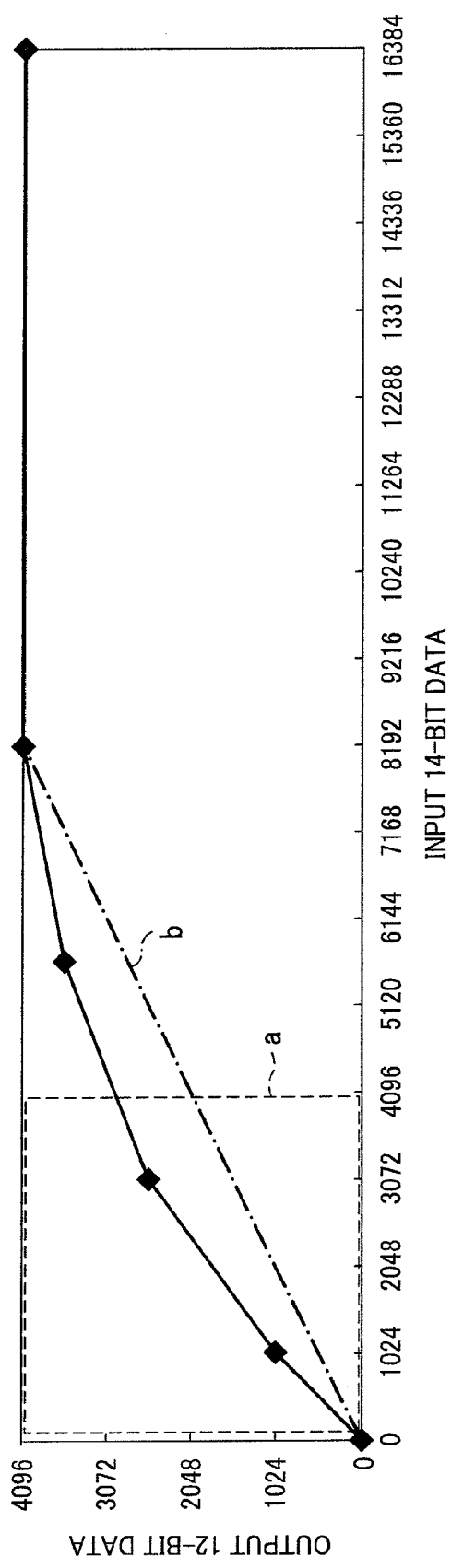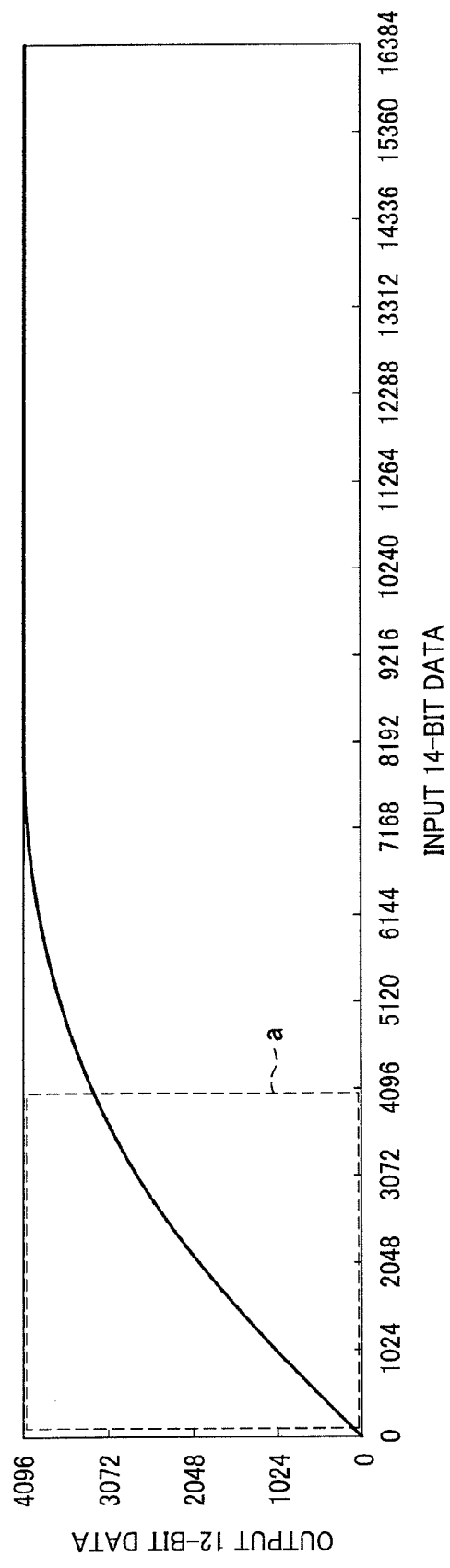

FIG. 17

| R | G | R | G | R | G | ······ |
|---|---|---|---|---|---|---|
| G | B | G | B | G | B | ······ |
| R | G | R1 | G | R | G | ······ |
| G | B1 | G | B2 | G | B | ······ |
| R | G | R2 | G | R | G | ······ |
| G | B | G | B | G | B | ······ |
| R | G | R | G | R | G | ······ |
| G | B | G | B | G | B | ······ |
| . | . | . | . | . | . | |
| . | . | . | . | . | . | |

FIG. 18

| R | G | R | G | R | G | ······ |
|---|---|---|---|---|---|---|
| G | B | G | B | G | B | ······ |
| R | G | R | G | R | G | ······ |
| G | B | G | B | G | B | ······ |
| R | G | R | G | R | G | ······ |
| G | B | G | B | G | B | ······ |
| R | G | R | G | R | G | ······ |
| G | B | G | B | G | B | ······ |
| . | . | . | . | . | . | |
| . | . | . | . | . | . | |

IMAGING APPARATUS AND IMAGING METHOD

CROSS REFERENCE TO RELATED APPLICATIONS

The present invention is based on and claims priority from Japanese Patent Application Number 2009-001669, filed 7 Jan., 2009, the disclosure of which is hereby incorporated by reference herein in its entirety.

BACKGROUND

The present invention relates to an imaging apparatus such as a digital still camera and a digital video camera, and to an imaging method. In particular, the present invention relates to an imaging apparatus which is capable of expanding a dynamic range of a shooting image and an imaging method thereof.

A dynamic range of an image shot by a digital still camera, a digital video camera, and the like having a solid-state image sensor such as a CCD is far narrower than a dynamic range of an image shot by a traditional silver-halide camera using silver-halide photography film. In a case where the dynamic range is narrow, "blackout" occurs in a dark area of a photographic subject and "whiteout" occurs in a bright area of the photographic subject, and thereby image quality becomes lower.

In order to expand the dynamic range of the image imaged by the solid-state image sensor such as the CCD, for example, Japanese patent application publication No. 2000-92378 discloses a technique in which a plurality of shootings is performed with different exposure amounts on the same photographic subject, a plurality of different exposure-amount images is obtained, and then these images are put together to produce a composite image with an expanded dynamic range.

However, in a case where a photographic subject is a moving object and is shot by a method of expanding the dynamic range as disclosed in Japanese patent application publication No. 2000-92378 above, double-images are often obtained and thereby a composite image with an expanded dynamic range is not produced successfully.

SUMMARY

An object of the present invention is to provide an imaging apparatus which is capable of expanding a dynamic range at one shooting, without performing a plurality of shootings with different exposure amounts, and producing a composite image with an expanded dynamic range, and to provide an imaging method thereof.

To achieve the object of the present invention, an embodiment of the present invention provides: an imaging apparatus, comprising: an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of the each of the pixels and images an image of the photographic subject; a pixel output judging processor which judges if each pixel output reaches each predetermined judging level or not; a pixel output compensation processor, wherein in a case where at least one of a pixel output of a pixel on which a specific color filter is placed of the pixels and a pixel output of a pixel on which a color filter other than the specific color filter is placed of the pixels in the vicinity of the pixel on which the specific color filter is placed is judged to reach a predetermined judging level by the pixel output judging processor, which compensates the pixel output of the pixel on which the specific color filter is placed; and a bit compression convertor which performs a bit compression such that pixel output data outputted from the pixel output compensation processor which is once converted from a first bit number into a second bit number larger than the first bit number is converted again into the first bit number, wherein the bit compression convertor, based on a bit compression characteristic set in each of segments that an image plane corresponding to the light receiving surface of the image sensor is plurally divided in the vertical and horizontal directions, performs the bit compression on the pixel output data in each of the segments.

Preferably, when the pixel output of the pixel on which the color filter other than the specific color filter is placed in the vicinity of the pixel on which the specific color filter is placed reaches a predetermined output level, the pixel output compensation processor compensates the pixel output of the pixel on which the specific color filter is placed based on the pixel output of the pixel on which the color filter other than the specific color filter is placed in the vicinity of the pixel on which the specific color filter is placed.

Preferably, when the pixel output of the pixel on which the specific color filter is placed reaches a predetermined saturation level, the pixel output compensation processor compensates the pixel output of the pixel on which the specific color filter is placed based on the pixel output of the pixel on which the color filter other than the specific color filter is placed based on the pixel output of the pixel on which the color filter other than the specific color filter is placed in the vicinity of the pixel on which the specific color filter is placed.

Preferably, the imaging apparatus further comprises: a pixel output distribution calculator which calculates a pixel output distribution in each of the segments, wherein the bit compression convertor performs the bit compression on the pixel output data in each of the segments based on a bit compression characteristic respectively set in accordance with the pixel output distribution in each of the segments calculated by the pixel output distribution calculator.

Preferably, the imaging apparatus further comprises: a pixel output distribution calculator which calculates a pixel output distribution in each of the segments, wherein the bit compression convertor performs the bit compression on the pixel output data in each of the segments based on a bit compression characteristic respectively set in accordance with the pixel output distribution in each of the segments calculated by the pixel output distribution calculator.

Preferably, the imaging apparatus further comprises: an average pixel output value calculator which calculates an average pixel output value in each of the segments, wherein the bit compression convertor performs the bit compression on the pixel output data in each of the segments based on a bit compression characteristic respectively set in accordance with the average pixel output value in each of the segments calculated by the average pixel output value calculator.

Preferably, the imaging apparatus further comprises: an average pixel output value calculator which calculates an average pixel output value in each of the segments, wherein the bit compression convertor performs the bit compression on the pixel output data in each of the segments based on a bit compression characteristic respectively set in accordance with the average pixel output value in each of the segments calculated by the average pixel output value calculator.

Preferably, the bit compression characteristic is set to be in a predetermined characteristic range for a criterial bit compression characteristic.

To achieve the object of the present invention, an embodiment of the present invention provides: an imaging method of an imaging apparatus including an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of the each of the pixels and images an image of the photographic subject, comprising: a pixel output judging processing step which judges if each pixel output reaches each predetermined judging level or not; a pixel output compensation processing step, wherein in a case where at least one of a pixel output of a pixel on which a specific color filter is placed of the pixels and a pixel output of a pixel on which a color filter other than the specific color filter is placed of the pixels in the vicinity of the pixel on which the specific color filter is placed are judged to reach a predetermined judging level by the pixel output judging processing step, which compensates the pixel output of the pixel on which the specific color filter is placed; and a bit compression converting step which performs a bit compression such that pixel output data outputted from the pixel output compensation processor which is once converted from a first bit number into a second bit number larger than the first bit number is converted again into the first bit number, wherein the bit compression converting step, based on a bit compression characteristic set in each of segments that an image plane corresponding to the light-receiving surface of the image sensor is plurally divided in the vertical and horizontal directions, performs the bit compression on the pixel output data in each of the segments.

Preferably, when the pixel output of the pixel on which the color filter other than the specific color filter is placed in the vicinity of the pixel on which the specific color filter is placed reaches a predetermined output level, the pixel output compensation processing step compensates the pixel output of the pixel on which the specific color filter is placed based on the pixel output of the pixel on which the color filter other than the specific color filter is placed in the vicinity of the pixel on which the specific color filter is placed.

Preferably, when the pixel output of the pixel on which the specific color filter is placed reaches a predetermined saturation level, the pixel output compensation processing step compensates the pixel output of the pixel on which the specific color filter is placed based on the pixel output of the pixel on which the color filter other than the specific color filter is placed in the vicinity of the pixel on which the specific color filter is placed.

Preferably, the imaging method further comprises: a pixel output distribution calculating step which calculates a pixel output distribution in each of the segments, wherein the bit compression converting step performs the bit compression on the pixel output data in each of the segments based on a bit compression characteristic respectively set in accordance with the pixel output distribution in each of the segments calculated by the pixel output distribution calculating step.

Preferably, the imaging method further comprises: a pixel output distribution calculating step which calculates a pixel output distribution in each of the segments, wherein the bit compression converting step performs the bit compression on the pixel output data in each of the segments based on a bit compression characteristic respectively set in accordance with the pixel output distribution in each of the segments calculated by the pixel output distribution calculating step.

Preferably, the imaging method further comprises: an average pixel output value calculating step which calculates an average pixel output value in each of the segments, wherein the bit compression converting step performs the bit compression on the pixel output data in each of the segments based on a bit compression characteristic respectively set in accordance with the average pixel output value in each of the segments calculated by the average pixel output value calculating step.

Preferably, the imaging method further comprises: an average pixel output value calculating step which calculates an average pixel output value in each of the segments, wherein the bit compression converting step performs the bit compression on the pixel output data in each of the segments based on a bit compression characteristic respectively set in accordance with the average pixel output value in each of the segments calculated by the average pixel output value calculating step.

Preferably, the bit compression characteristic is set to be in a predetermined characteristic range for a criterial bit compression characteristic.

BRIEF DESCRIPTION OF THE DRAWINGS

FIG. 10A illustrates a case where each pixel output of the R and B filters in the vicinity of the G filter is extremely small, when the pixel output of the G filter reaches the saturation level.

FIG. 10B illustrates a state where the pixel output of the G filter is compensated to be less than or equal to the saturation level, in a case where each pixel output of the R and B filters in the vicinity of the G filter is extremely small when the pixel output of the G filter reaches the saturation level.

FIG. 11A illustrates an example of a conversion characteristic which converts expanded 14-bit data of the pixel output of the G filter to 12-bit data in embodiment 1 of the present invention.

FIG. 11B illustrates an example of a conversion characteristic which converts expanded 14-bit data of the pixel output of the G filter to 12-bit data in another example of embodiment 1 of the present invention.

FIG. 17 illustrates a position of a pixel arrangement and a processing unit of a CCD on which an RGB filter is arranged in embodiment 5 of the present invention.

FIG. 18 illustrates a position of a pixel arrangement and a processing unit of a CCD on which an RGB filter is arranged in embodiment 6.

DETAILED DESCRIPTION OF THE PREFERRED EMBODIMENTS

Hereinafter, with reference to the drawings, embodiments of the present invention will be explained.

[Embodiment 1]

Figure 1A:
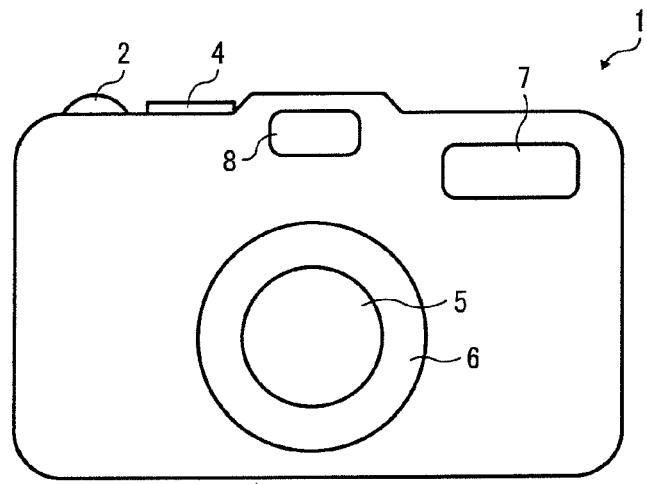
FIG. 1A is a front view of a digital camera as an example of an imaging apparatus according to embodiment 1 of the present invention.
Figure 1B:
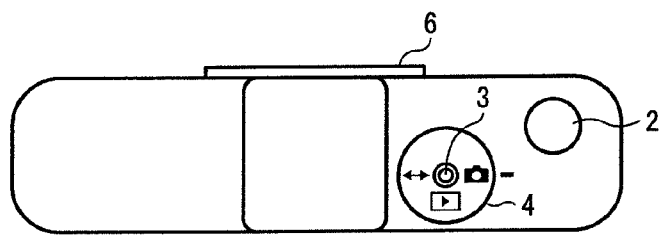
FIG. 1B is a top view of the digital camera as an example of the imaging apparatus according to embodiment 1 of the present invention.
Figure 1C:
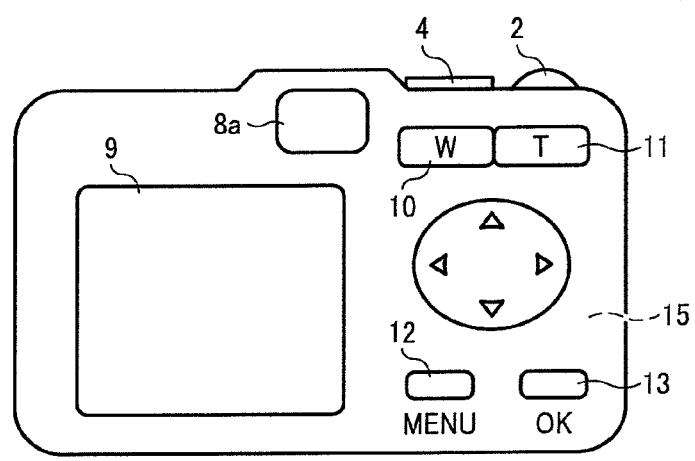
FIG. 1C is a back view of the digital camera as an example of the imaging apparatus according to embodiment 1 of the present invention.
Figure 2:
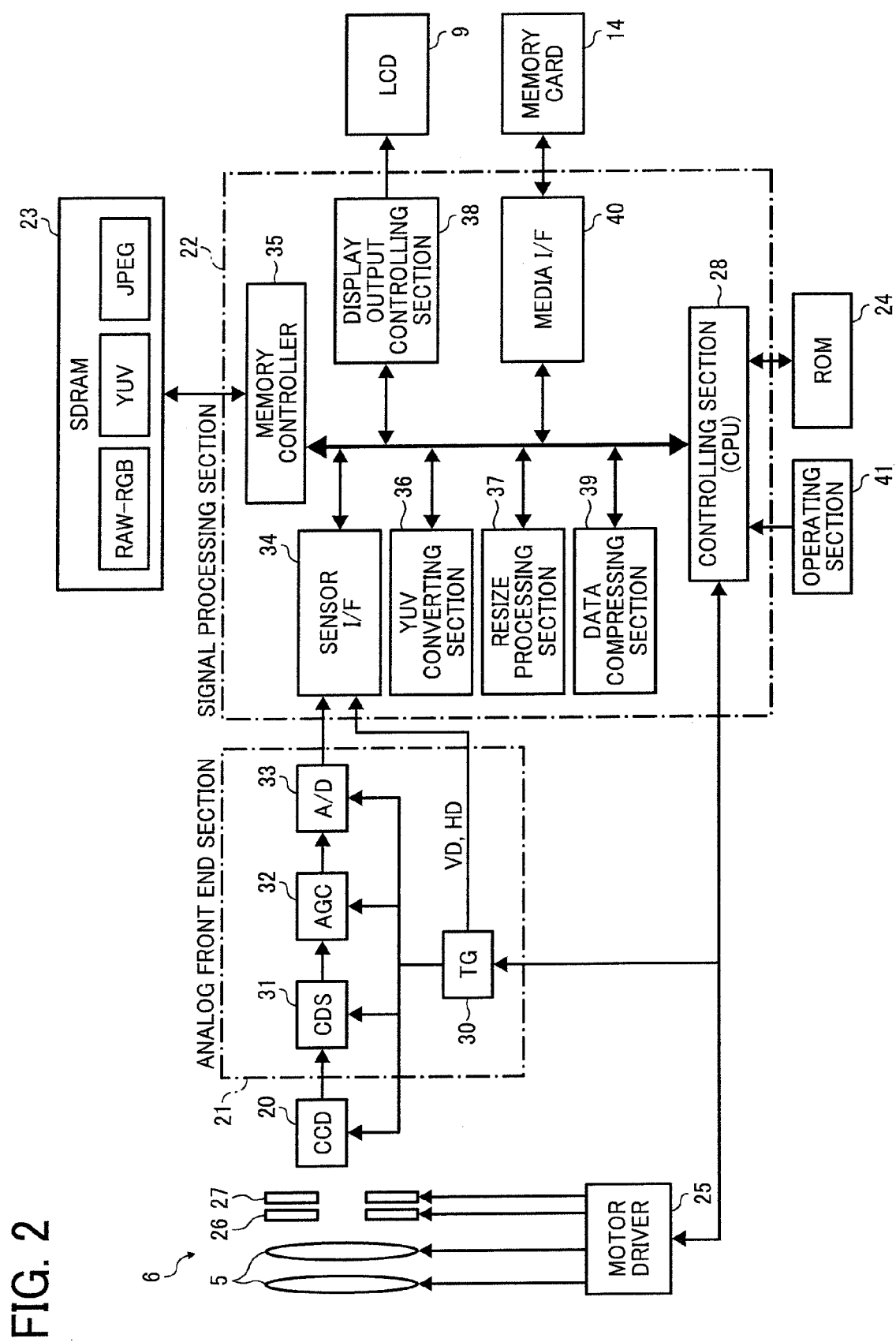
FIG. 2 is a schematic block diagram illustrating a system configuration in the digital camera as an example of the imaging apparatus according to embodiment 1 of the present invention.

FIG. 1A is a front view, FIG. 1B is a top view, and FIG. 1C is a back view of a digital still camera (hereinafter, it is referred to as a "digital camera") as an example of an imaging apparatus according to embodiment 1 of the present invention. FIG. 2 is a schematic block diagram illustrating a system configuration in the digital camera illustrated in FIGS. 1A to 1C.

(External Appearance Configuration of a Digital Camera)

As illustrated in FIGS. 1A to 1C, on a top side of the digital camera 1 (an imaging apparatus) according to the present embodiment, a shutter release button (shutter button) 2, a power button 3, and a shooting/playback switch dial 4 are provided. On a front side of the digital camera 1, a lens barrel unit 6 having a photographing lens system 5 (an optical system), a stroboscopic light emitting section (flash) 7, and an optical viewfinder 8 are provided.

On a back side of the digital camera 1, a liquid crystal display (LCD) monitor 9, an eyepiece lens section 8a of the optical viewfinder 8, a wide angle zoom (W) switch 10, a telephoto zoom (T) switch 11, a menu (MENU) button 12, a confirmation (OK) button 13 and so on are provided. Additionally, inside a side of the digital camera 1, a memory card storing section 15 is provided. The memory card storing section 15 stores a memory card 14 (see FIG. 2) which stores shot image data.

(System Configuration of the Digital Camera)

As illustrated in FIG. 2, the digital camera 1 has a CCD (Charge-Coupled Device) 20 (an image sensor) as a solid-state image sensor, an analog front end section 21 (hereinafter, it is referred to as an "AFE section."), a signal processing section 22, an SDRAM (Synchronous Dynamic Random Access Memory) 23, a ROM (Read Only Memory) 24, a motor driver 25 and so on. The CCD 20 as the solid-state image sensor images light incident from a photographic subject via the photographing lens system 5 of the lens barrel unit 6 on a light receiving surface as an image of the photographic subject. The AFE section 21 converts an electric signal (an analog RGB image signal) outputted from the CCD 20 into a digital signal. The signal processing section 22 processes the digital signal outputted from the AFE section 21. The SDRAM 23 temporarily stores data. A control program and so on are kept in the ROM 24. The motor driver 25 drives the lens barrel unit 6.

The lens barrel unit 6 comprises the photographing lens system 5, an aperture unit 26, and a mechanical shutter unit 27. The photographing lens system 5 has a zoom lens, a focus lens and so on. Each driver unit of the photographing lens system 5, the aperture unit 26, and the mechanical shutter unit 27 is driven by the motor driver 25. The motor driver 25 is driven and controlled by a driving signal from a controlling section (CPU, Central Processing Unit) 28 of the signal processing section 22.

Figure 3:
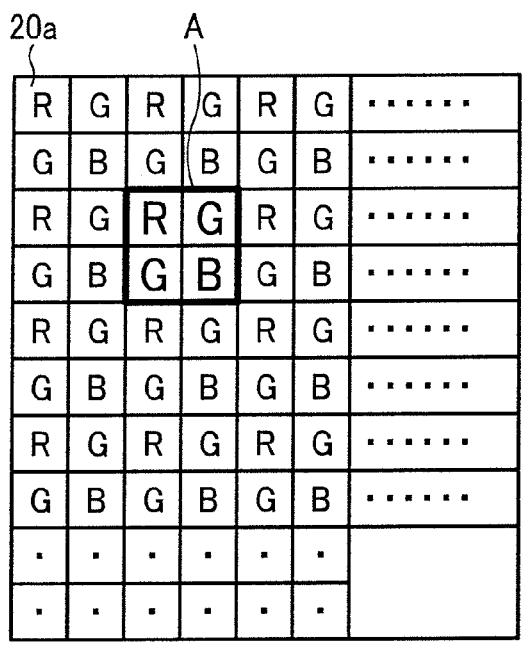
FIG. 3 illustrates a position of a pixel arrangement and a processing unit of a CCD on which an RGB filter is arranged in embodiment 1 of the present invention.

As illustrated in FIG. 3, the CCD 20 comprises a plurality of pixels 20a. An RGB primary-color filter (hereinafter, it is referred to as an "RGB filter.") of Bayer arrangement is placed on the plurality of pixels. The CCD 20 outputs an electric signal (an analog RGB image signal) corresponding to RGB, the three primary colors.

The AFE section 21 comprises a TG (a timing signal generating section) 30, a CDS (a correlated double sampling section) 31, an AGC (an analog gain controlling section) 32, and an A/D converting section (an analog/digital converting section) 33. The TG 30 drives the CCD 20. The CDS 31 samples the electric signal (the analog RGB image signal) which is outputted from the CCD 20. The AGC 32 adjusts a gain of the image signal which is sampled in the CDS 31. The A/D converting section 33 converts the image signal which is gain-adjusted in the AGC 32 into a digital signal (hereinafter, it is referred to as "RAW-RGB data").

The signal processing section 22 comprises a sensor interface (hereinafter, it is referred to as a "sensor I/F") 34 (a pixel output distribution calculator, an average pixel output value calculator), a memory controller 35, a YUV converting section 36, a resize processing section 37, a display output controlling section 38, a data compressing section 39, a media interface (hereinafter, it is referred to as a "media I/F") 40, and the controlling section (CPU) 28. The sensor I/F 34 receives outputs of a picture horizontal synchronizing signal (HD), a picture vertical synchronizing signal (VD) and a pixel transfer clock (pixel clock) from the TG 30 of the AFE section 21, and loads RAW-RGB data which is outputted from the A/D converting section 33 of the AFE section 21 synchronizing with these synchronizing signals. The memory controller 35 controls the SDRAM 23. The YUV converting section 36 converts the loaded RAW-RGB data into image data in YUV format which is displayable and recordable. The resize processing section 37 changes a size of an image in accordance with the size of the image data which is displayed or recorded. The display output controlling section 38 controls a display output of the image data. The data compressing section 39 records the image data in JPEG format and so on. The media I/F 40 writes the image data in the memory card 14 and reads out the image data written in the memory card 14. The controlling section (CPU) 28 performs a whole system control of the digital camera 1 and so on by the control program kept in the ROM 24 based on operating information inputted from an operating section 41.

The operating section 41 comprises the shutter release button 2, the power button 3, the shooting/playback switch dial 4, the wide angle zoom switch 10, the telephoto zoom switch 11, the menu (MENU) button 12, the confirmation (OK) button 13 and the like on an external surface of the digital camera 1 (see FIGS. 1A to 1C). A predetermined operation indicating signal is inputted to the controlling section 28 by an operation of a user.

In the SDRAM 23, the RAW-RGB data loaded in the sensor I/F 34, YUV data (image data in YUV format) which is converted in the YUV converting section 36, additionally, image data in JPEG format which is compressed in the data compressing section 39 and so on are stored.

Y in YUV is brightness data. U and V in the YUV provide color information. The U is a color difference between brightness data and blue data (B), and the V is a color difference between brightness data and red data (R). The YUV is a format in which colors are expressed by these three, the Y, U, and V.

(Monitoring (Live-preview) Operation and Still Image Shooting Operation of the Digital Camera)

Next, a monitoring operation and a still image shooting operation of the digital camera 1 will be explained. In a still image shooting mode, the digital camera 1 performs the still image shooting operation while the monitoring operation as described below is performed.

Firstly, the power button 3 is turned on by a user, the shooting/playback switch dial 4 is set to a shooting mode, and then the digital camera 1 starts operating in a recording mode. When the controlling section 28 detects that the power button 3 is turned on and the shooting/playback switch dial 4 is set to the shooting mode, the controlling section 28 outputs a control signal to the motor driver 25 to move the lens barrel unit 6 to a position where shooting is possible and to start operating the CCD 20, the AFE section 21, the signal processing section 22, the SDRAM 23, the ROM 24, the LCD monitor 9 and the like.

The photographing lens system 5 of the lens barrel unit 6 is aimed at a photographic subject, and thereby light incident from the photographic subject via the photographing lens system 5 is imaged on a light receiving surface of the CCD 20 as an image of the photographic subject. And an electric signal corresponding to the image of the photographic subject outputted from the CCD 20 (an analog RGB image signal) is inputted to the A/D converting section 33 via the CDS 31 and the AGC 32, and then the electric signal is converted into 12-bit RAW-RGB data by the A/D converting section 33.

This RAW-RGB data is loaded to the sensor I/F 34 of the signal processing section 22 and is stored in the SDRAM 23 via the memory controller 35. And after the RAW-RGB data which is read out from the SDRAM 23 is converted into YUV data (YUV signal), which is a displayable format, in the YUV converting section 36, the YUV data is stored in the SDRAM 23 via the memory controller 35.

The YUV data which is read out from the SDRAM 23 via the memory controller 35 is transmitted to the LCD monitor 9 via the display output controlling section 38, and a photographic subject image is displayed. When monitoring the photographic subject image which is displayed on the LCD monitor 9, image data of the photographic subject for one frame is read out at 1/30 second (i.e. 30 fps) by the sensor I/F 34.

When this monitoring operation is performed, it is in a state where the photographic subject image is only displayed on the LCD monitor 9 functioning as an electric viewfinder, and the shutter release button 2 is not yet pressed (and not half-pressed, either).

It is possible for the user to check the photographic subject image by displaying the photographic subject image on the LCD monitor 9. In addition, a TV video signal is outputted from the display output controlling section 38, and the photographic subject image is also displayed on an external TV (television) via a video cable.

The sensor I/F 34 of the signal processing section 22 calculates an AF (Auto Focus) evaluation value, an AE (Auto Exposure) evaluation value, and AWB (Auto White Balance) evaluation value by the RAW-RGB data which is loaded.

The AF evaluation value is calculated by, for example, an output integral value of a high frequency component extraction filter and an integral value of brightness difference between adjacent pixels. In a focusing state, an edge part of the photographic subject is clear, and the high frequency component is highest. By use of this, in a case where the AF operation is performed (when a focus position detection operation is performed), AF evaluation values in each focus lens position of the photographing lens system 5 are obtained, and a maximum value among them is taken as a focus position detected position, and then the AF operation is performed.

The AE evaluation value and the AWB evaluation value are calculated from each of accumulated values of RGB values of the RAW-RGB data. For example, an image plane corresponding to the light receiving surface of entire pixels of the CCD 20 is equally divided into 1024 segments (32 horizontal segments and 32 vertical segments), and each of accumulated values of the RGB values in each of the segments is calculated.

The controlling section 28 reads out each of accumulated values of the RGB values which is calculated. In an AE operation, brightness of each of the segments of the image plane is calculated, and an appropriate exposure amount is determined by a distribution of brightness. An exposure condition (the number of releases of the electric shutter of the CCD 20, an aperture value of the aperture unit 26 and the like) is set based on the determined exposure amount. In an AWB operation, a control value of the AWB corresponding to a color of a light source of the photographic subject is determined based on a distribution of RGB. This AWB operation adjusts a white balance when the RAW-RGB data is converted into the YUV data in the YUV converting section 36. The AE operation and the AWB operation are continuously performed while the monitoring operation is performed.

An average pixel output value is calculated from the AE evaluation value. As described above, each of accumulated values of the RGB values is calculated per segment, therefore the controlling section 28 calculates the average pixel output value of each of the segments by dividing each of accumulated value of the RGB values by the number of pixels of RGB included in each of the segments.

As well as the AE evaluation value and the AWB operation, an image plane corresponding to the light receiving surface of entire pixels of the CCD 20 is equally divided into 1024 segments (32 horizontal segments and 32 vertical segments), and a histogram (distribution) of the pixel output of the G filter in each of the segments is calculated. The reasons for performing on only the G filter are that a change of the pixel output of the G filter by a color temperature of the light source is small, and a size of a circuit can be small, and the pixel output of the G filter is dominant in a calculation of the brightness data Y.

As for photographing a still image, while the monitoring operation described above is performed, if a still image shooting operation in which the shutter release button 2 is pressed (from half-pressed to fully-pressed) is started, the AF operation which is the focus position detecting operation and a still image recording operation are performed.

That is, when the shutter release button 2 is pressed (from half-pressed to fully-pressed), a focus lens of the photographing lens system 5 is moved by a drive command from the controlling section 28 to the motor driver 25, and for example, the AF operation of a contrast evaluation system is performed.

In a case where the AF (focus) coverage is an entire area from infinity to the closest, the focus lens of the photographing lens system 5 is moved in a distance from the closest to infinity or the distance from infinity to the closest, and the controlling section 28 reads out the AF evaluation value in each focus lens position which is calculated in the sensor I/F 34. And the focus lens is moved to the focus position where the AF evaluation value of each focus lens position is maximum, and the AF operation is achieved.

Then the AE operation described above is performed. When completing an exposure, the mechanical shutter unit 27 is closed by a drive command from the controlling section 28 to the motor driver 25, and an analog RGB image signal for a still image is outputted from the CCD 20. And the analog RGB image signal for the still image is converted into RAW-RGB data in the A/D converting section 33 of the AFE section 21 as well as when monitoring as described above.

This RAW-RGB data is loaded into the sensor I/F 34 of the signal processing section 22, and is converted into YUV data in the YUV converting section 36, which is described later, and then is stored in the SDRAM 23 via the memory controller 35. This YUV data is read out from the SDRAM 23, and is converted into a size corresponding to the number of recording pixels in the resize processing section 37, and then is compressed to image data in JPEG format and so on in the data compressing section 39.

After this compressed image data in JPEG format and so on is restored in the SDRAM 23, this compressed image data is read out from the SDRAM 23 via the memory controller 35, and then is stored in the memory card 14 via the media I/F 40.

(A Principle of Dynamic Range Expansion by the YUV Converting Section 36)

On each pixel comprising the CCD 20 of the digital camera 1, an RGB filter (see FIG. 3) of Bayer arrangement is placed. In a general RGB filter, with respect to light which has a wide wavelength range such as sunlight, a sensitivity to brightness of each color, R (red), G (green), and B (blue) is different.

Figure 4:
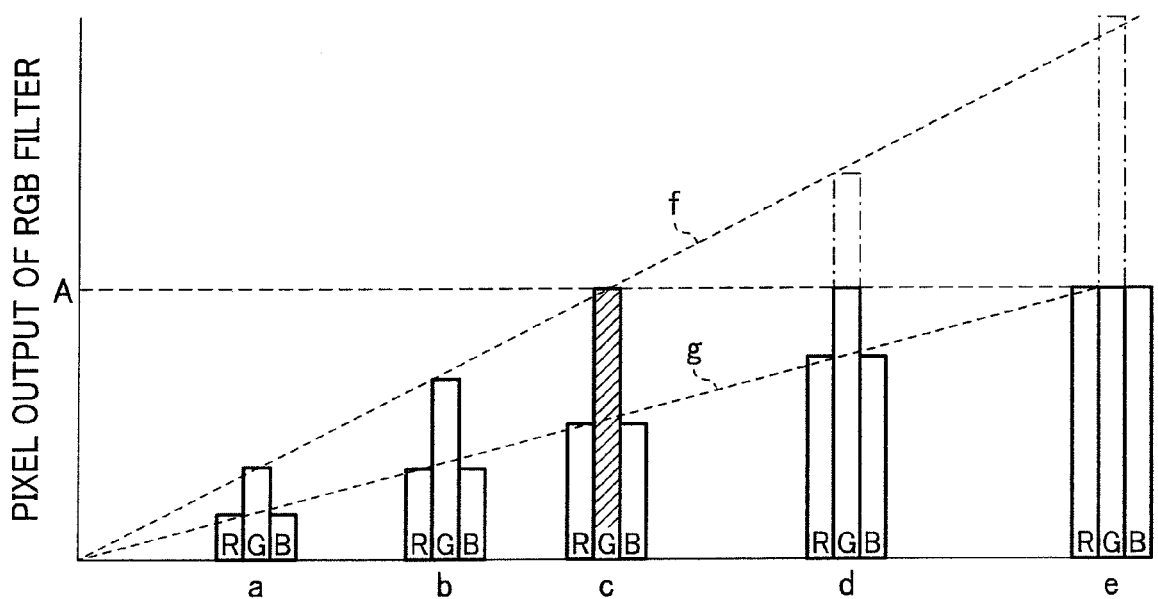
FIG. 4 illustrates an example of a shooting setting screen displayed on an LCD (Liquid Crystal Display) monitor in embodiment 1 of the present invention.

For example, as illustrated in FIG. 3, in a case where the CCD 20 has an RGB filter ("a", "b", and "c" in FIG. 4) with a sensitivity in which a sensitivity of a G (green) filter is approximately twice as high as sensitivities of R (red) and B (blue) filters, when the same amount of light, which has a wide wavelength range such as sunlight, is incident on the RGB filter, a pixel output of the G filter (a shaded part of "c" in FIG. 4) reaches a saturation level A (a dotted line A) earlier, compared to each pixel output of the R and B filters. In FIG. 4, a dotted-line "f" illustrates a pixel sensitivity characteristic of the G filter and a dotted-line "g" illustrates each pixel sensitivity characteristic of the R and B filters. The pixel sensitivity characteristic of the G filter has approximately a twofold sensitivity compared to each pixel sensitivity characteristic of the R and B filters.

Incidentally, in a digital camera including a solid-state image sensor such as a CCD and the like having a general RGB filter, as the RGB filter of the "a", "b", and "c" in FIG. 4, a range of the dynamic range is set corresponding to the saturation level A of the pixel output of the G filter which has a high sensitivity. That is, in a case where the pixel output of the G filter reaches the saturation level A, the pixel output of the R and B filters is approximately a half (½) of the saturation level A.

On the other hand, in the present invention, as the RGB filters of "d" and "e" in FIG. 3, if the pixel output of the G filter exceeds the saturation level A, when each pixel output of the R and B filters is within each saturation level, from each pixel output level of the R and B filters, on the basis of each pixel sensitivity characteristic of the R and B filters (the dotted-line "g" in FIG. 4) and the pixel sensitivity characteristic of the G filter (the dotted-line "f" in FIG. 4), the pixel output of the G filter is compensated (dash-dot line parts in FIG. 4) so as to expand the dynamic range corresponding to only an amount which is compensated as described above.

In the present embodiment as described above, with respect to light which has a wide wavelength range such as sunlight, the pixel sensitivity characteristic of the G filter has approximately a twofold sensitivity compared to each pixel sensitivity characteristic of the R and B filters. Therefore, a maximum value of a dynamic range expansion level in the present embodiment is approximately twofold compared to an ordinary photographing operation without performing a dynamic range expanding process.

In the present embodiment, the pixel sensitivity characteristic of the G filter has approximately a twofold sensitivity compared to each pixel sensitivity characteristic of the R and B filter, and the maximum value of the dynamic range expansion level is approximately twofold. However, by changing each pixel sensitivity characteristic of the RGB filter, it is possible to set the maximum value of the dynamic range expansion level to be a predetermined value which is equal to or more than twofold, or a predetermined value which is less than or equal to twofold.

(A Basic Process of a Dynamic Range Expanding Process by the YUV Converting Section 36)

The YUV converting section 36 of the digital camera 1 according to the present embodiment has a dynamic range expanding process function to expand a dynamic range.

Figure 5:
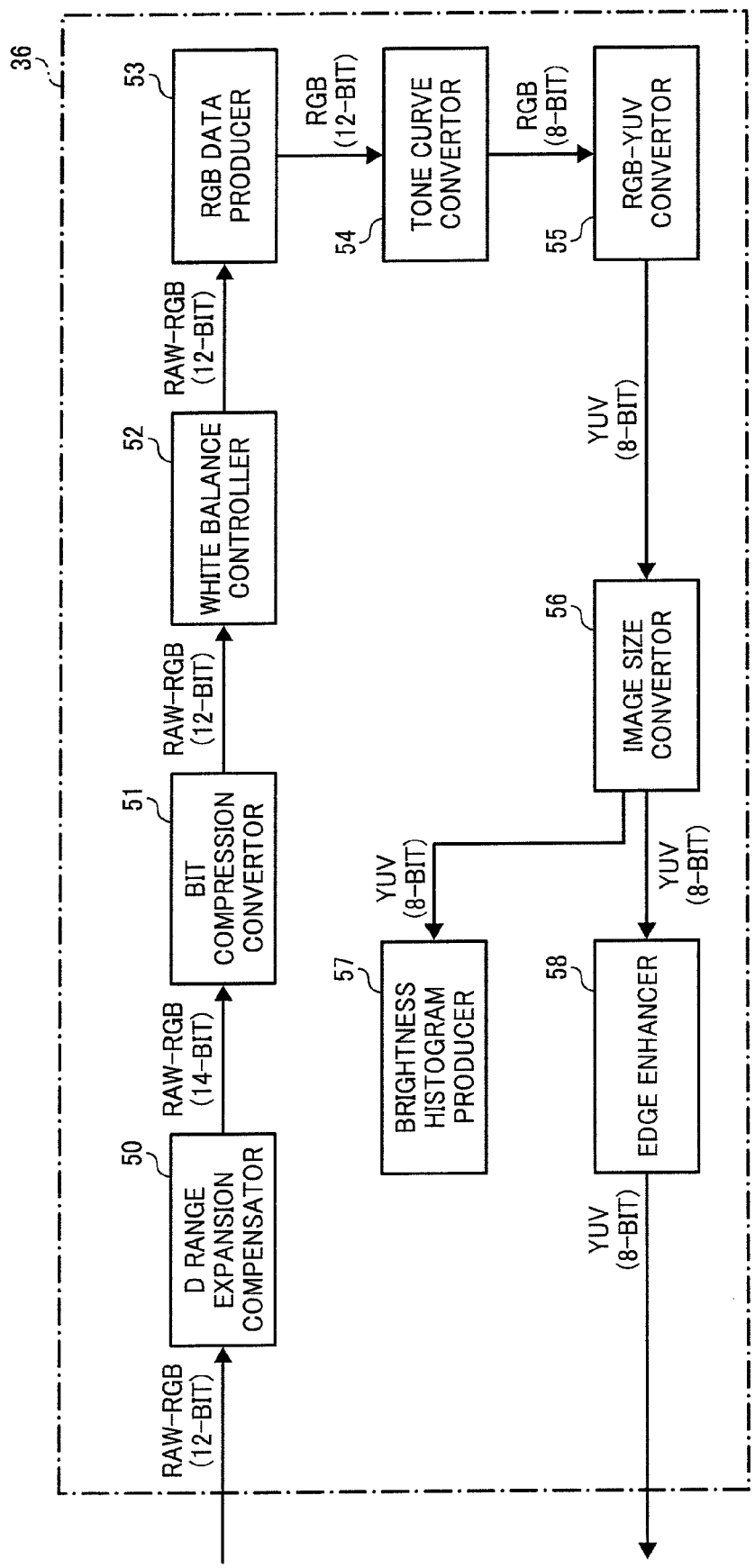
FIG. 5 is a block diagram illustrating a configuration of a YUV converting section 36 in embodiment 1 of the present invention.

As illustrated in FIG. 5, the YUV converting section 36 comprises a dynamic range expansion compensator (hereinafter, it is referred to as a "D range expansion compensator") 50, which is described later, a bit compression convertor 51, a white balance controller 52, an RGB data producer 53, a tone curve convertor 54, an RGB-YUV convertor 55, an image size convertor 56, a brightness histogram producer 57, and an edge enhancer 58.

Figure 6:
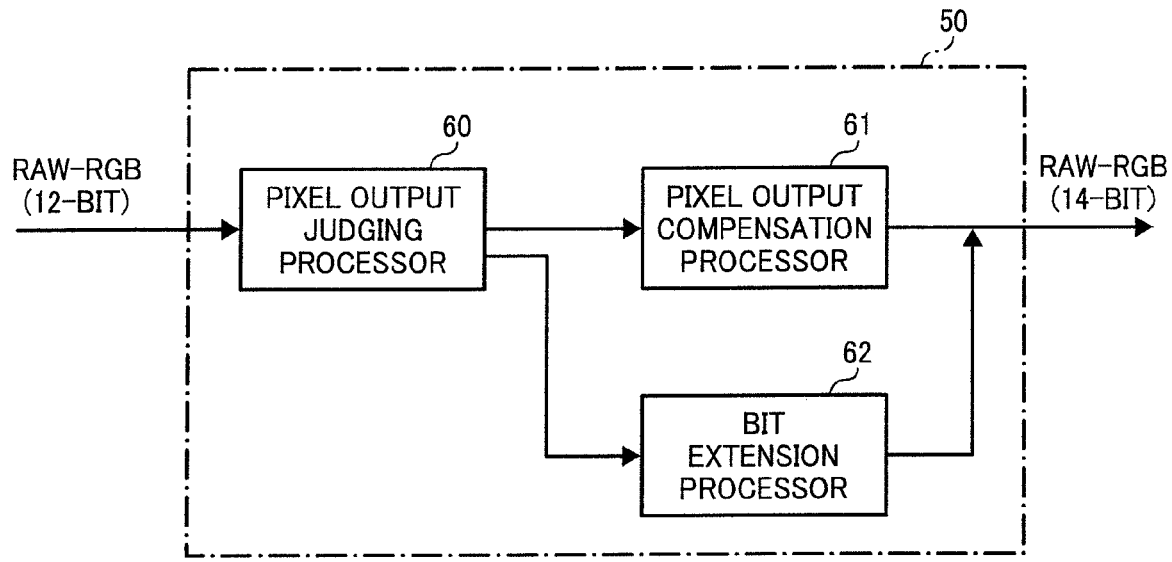
FIG. 6 is a block diagram illustrating a configuration of a D (dynamic) range expansion compensator 50 in embodiment 1 of the present invention.

As illustrated in FIG. 6, the D range expansion compensator 50 comprises a pixel output judging processor 60, a pixel output compensation processor 61, and a bit extension processor 62. Processings of the pixel output judging processor 60 and the pixel output compensation processor of 61 of the D range expansion compensator 50 will be described later. The bit extension processor 62 performs only a bit extension from 12-bit to 14-bit each on the pixel outputs of the R and B filters without performing a conversion of an output level.

Hereinafter, a dynamic range expanding process according to the present embodiment will be explained.

Figure 7:
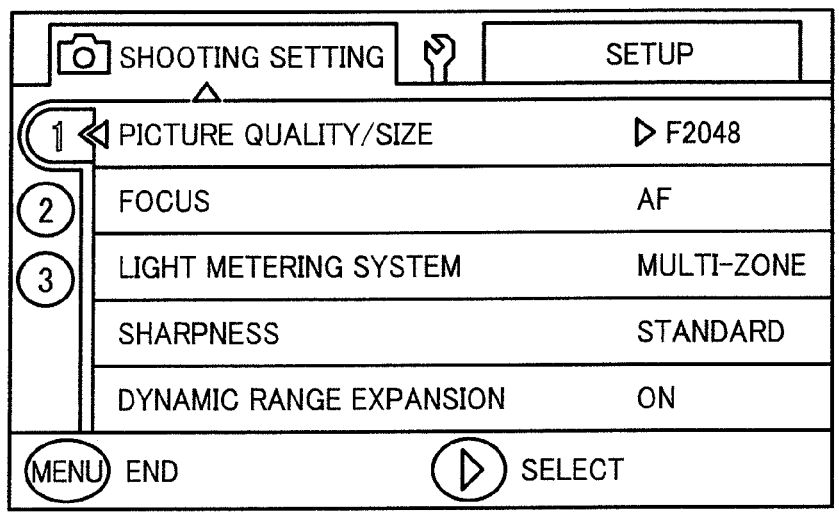
FIG. 7 illustrates an example of a photographing setting screen displayed on an LCD monitor.

In the present embodiment, when the menu (MENU) button 12 (see FIG. 1C) is pressed by the user, and then, for example, a shooting setting screen as illustrated in FIG. 7 appears on the LCD monitor 9. By selecting "ON" from an item of "dynamic range expansion" on the screen, a control signal is outputted from the controlling section 28 to the YUV converting section 36 and the dynamic range expanding process to expand the dynamic range is performed.

The RAW-RGB data is firstly inputted into the pixel output judging processor 60 of the D range expansion compensator 50.

The pixel output judging processor 60 detects a pixel output of each pixel provided with an RGB filter from the inputted RAW-RGB data, and judges whether a pixel output of the pixel provided with the G filter (hereinafter, it is referred to as "pixel output of G filter") reaches a saturation level which is set beforehand and judges whether each pixel output of pixels provided with the R and B filters (hereinafter, it is referred to as "pixel outputs of R and B filters") in the vicinity of the pixel provided with the G filter reaches a predetermined output level which is set beforehand.

And in a case where the pixel output of the G filter reaches the saturation level and at least one of pixel outputs of the R and B filters reaches the predetermined output level, the pixel output judging processor 60 calculates a compensation coefficient, which is described later, to compensate the pixel output of the G filter based on data of the pixel output of the G filter which reaches the saturation level and the at least one of the pixel outputs of the R and B filters reaches the predetermined output level. And a judgment as to whether the above compensation is performed is not limited by only a case where the pixel output of the G filter reaches the saturation level and at least one of pixel outputs of the R and B filters reaches the predetermined output level, and may be limited by a case where only the pixel output of the G filter reaches the saturation level, or a case where only at least one of pixel outputs of the R and B filters reaches the predetermined output level.

The pixel output compensation processor 61 performs a compensating process of the pixel output of the G filter by multiplying the pixel output of the G filter by the compensation coefficient calculated in the pixel output judging processor 60.

In a case where the compensation coefficient for the pixel output of the G filter is calculated in the pixel output judging processor 60, in the present embodiment, for each pixel of the CCD 20 having the RGB filter, 2×2 pixels (2 pixels of the G filter, 1 pixel of the R filter, and 1 pixel of the B filter) in a bold-line frame A are taken as a processing unit (minimum unit), as illustrated in FIG. 7. A compensation coefficient (K) of the pixel output of the G filter, and a pixel output (Ge) of the G filter after performing the compensating process are calculated respectively by a formula (1) and a formula (2) below.

$$K = \{l \times f(Ro) + m \times f(Go) + n \times f(Bo)\}/3 \quad \text{formula (1)}$$

$$Ge = K \times Go \quad \text{formula (2)}$$

In the above formulas (1) and (2), l, m, and n are coefficients which are set based on sensitivity rates of each filter of the RGB filter and Go is a pixel output of the G filter before performing the compensating process. f (Ro), f (Go), and f (Bo) are coefficients which are set by Number 1 (formulas (3) to (5)) below.

[Number 1]

If $Ro \leq TR: f(Ro) = 1$

If $Ro > TR: f(Ro) = Ro/TR$  formulas (3)

If $Go < TG: f(Go) = 1$

If $Go = TG: f(Go) = Go/TG$  formulas (4)

If $Bo \leq TB: f(Bo) = 1$

If $Bo > TB: f(Bo) = Bo/TB$  formulas (5)

Ro is a pixel output of the R filter, TR is a predetermined output level of a pixel output of the R filter, Go is a pixel output of the G filter before the compensating process, TG is a saturation level of a pixel output of the G filter, Bo is a pixel output of the B filter, and TB is a predetermined output level of a pixel output of the B filter.

Figure 8:
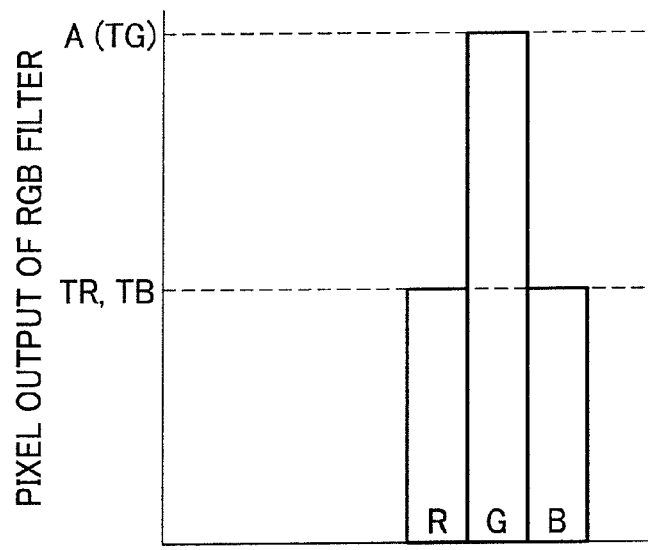
FIG. 8 illustrates a predetermined saturation level (judging level) (TG) of a pixel output of a G filter, and predetermined output levels (judging levels) (TR, TB) of pixel outputs of R and B filters of an RGB filter.

TR, TG and TB in the above formulas (3) to (5) correspond to predetermined judging levels of each pixel output of the RGB filters, for example, under a light source illustrated in FIG. 8. In FIG. 8, TG (A) is the saturation level (judging level) of the pixel output of the G filter, TR is the predetermined output level (judging level) of the pixel output of the R filter, and TB is the predetermined output level (judging level) of the pixel output of the B filter.

As illustrated in FIG. 8, under this light source, as described above, a sensitivity of the pixel provided with the G filter is twice as high as those of the pixel provided with the R and B filters; therefore the pixel output of the G filter firstly reaches a saturation level A. A saturation level of the pixel output of the G filter is taken as TG (A), and each saturation level of the pixel outputs of the R and B filters is set to ½ value of the TG. TR and TB are taken as predetermined output levels of the pixel outputs of the R and B filters, respectively. TR, TG, and TB depend on a characteristic (sensitivity rate) of a solid-state image sensor (CCD and the like) having an RGB filter used for an imaging apparatus (digital camera and the like) and a color temperature of the light source; therefore they are not limited to a proportion as illustrated in FIG. 8.

In terms of the sensitivity rate of each pixel output of the RGB filter, in a case illustrated in FIG. 8, the coefficients l and n are respectively taken as 3/2 and m is taken as 0 in the above formula (1), and thereby the compensation coefficient (K) of the pixel output of the G filter is calculated. And a value of the pixel output (Ge) of the G filter after performing the compensating process calculated from the above formula (2) used by this compensation coefficient (K) is replaced as a value of the pixel output of 2 G filters in the processing unit (see FIG. 3).

This value of the pixel output of the G filter becomes data which exceed a value of 12-bit data; therefore the value of the pixel output of the G filter is once converted to 14-bit data. Accordingly, both maximum values of the pixel outputs of the R and B filters are 4095 (12-bit), and the maximum value of the pixel output of the G filter becomes 8190; therefore it can be treated as 14-bit data.

Incidentally, before the compensation coefficient of the pixel output of the G filter is calculated in the pixel output judging processor 60, a compensation of a defective pixel needs to be completed. That is, in a case where there is a defective pixel in each pixel output provided with the RGB filter and there is a pixel which outputs a value which is always saturated, the compensation coefficient becomes a larger value, and as a result, the pixel output of the G filter after the compensation is replaced as a larger value; therefore a new defective pixel is produced. Accordingly, in the present embodiment, a defective pixel removal processing section (not illustrated), which removes a defective pixel, is provided with the sensor I/F 34.

In the formulas (3) to (5), in a case where the pixel output of the G filter of the RGB filter is less than or equal to the saturation level TG, and the pixel outputs of the R and B filters of the RGB filter are less than or equal to the predetermined output level TR and TB, each coefficient f (Ro), f (Go) and f (Bo) is set to be "1". This is in order that a value of the pixel output of the G filter after the compensation (Ge) does not become smaller than a value of the pixel output of the G filter before the compensation (Go).

Figure 9A:
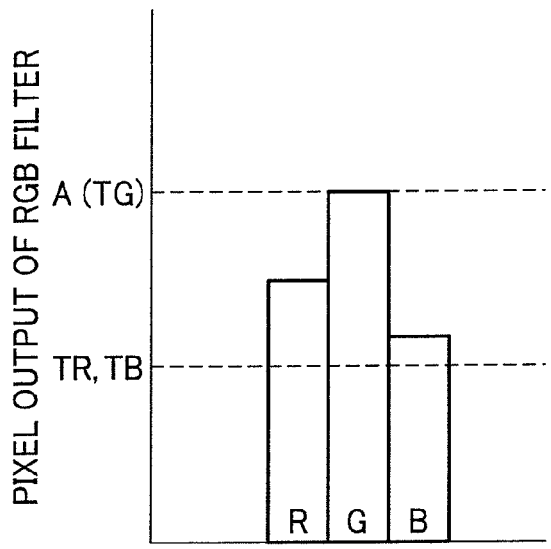
FIG. 9A illustrates a case where the pixel output of the G filter reaches the saturation level and each pixel output of the R and B filters in the vicinity of the G filter is relatively high.
Figure 9B:
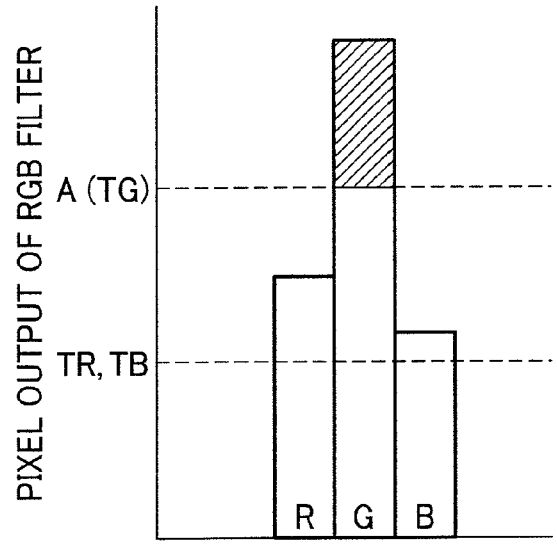
FIG. 9B illustrates a state where the pixel output of the G filter is compensated to expand to equal to or more than the saturation level A.

That is, for example, as illustrated in FIG. 9A, in a case where the pixel output of the G filter in the processing unit (see FIG. 3) reaches the saturation level A and each pixel output of the R and B filters in the vicinity of the G filter is relatively high (less than the saturation level A of the pixel output of the G filter), as illustrated in FIG. 9B, based on the formulas (1) to (5), the pixel output of the G filter is compensated to expand to be equal to or more than the saturation level A, and thereby the dynamic range is expanded.

However, for example, as illustrated in FIG. 10A, even when the pixel output of the G filter reaches the saturation level A, there often is a case where each pixel output of the R and B filters in the vicinity of the G filter is extremely small compared to the pixel output of the G filter. In this case, in the formulas (3) to (5), when the pixel output of the G filter of the RGB filter is smaller than the saturation level TG and each pixel output of the R and B filters of the RGB filter is smaller than the predetermined output level TR and TB, in a case where each of the coefficients f(Ro), f(Go), and f(Bo) is not set to be "1", if the pixel output of the G filter is compensated, as illustrated in FIG. 10B, a problem such that the pixel output of the G filter is less than or equal to the saturation level A occurs, due to an influence of the R and B filters where each pixel output in the vicinity of the G filter is extremely small.

Therefore, as illustrated in the formulas (3) to (5), a comparison of the pixel output of the G filter and the saturation level of the pixel output of the G filter, a comparison of the pixel output of the R filter and the predetermined output level of the pixel output of the R filter, and a comparison of the pixel output of the B filter and the predetermined output level of the pixel output of the B filter are performed respectively, and a dynamic range expansion is performed only in a case where a calculation result becomes larger than a former value of the pixel output of the G filter used for the above comparison, as illustrated in FIG. 9B. In FIGS. 9A, 9B, 10A and 10B, A(TG) is a saturation level of the pixel output of the G filter, TR is a predetermined output level of the pixel output of the R filter, and TB is a predetermined output level of the pixel output of the B filter.

Thus, even when the pixel output of the G filter reaches the saturation level A, in a case where each pixel output of the R and B filters in the vicinity of the G filter is extremely small compared to the pixel output of the G filter, the compensating process on the pixel output of the G filter is canceled, and thereby a color deviation occurring by the pixel output of the G filter which is lowered is prevented.

And data of the pixel output of the G filter compensated by the pixel output compensation processor 61 and data of the pixel outputs of the R and B filters only performed the bit extension in the bit extension processor 62 of the D range expansion compensator 50 are outputted to the bit compression convertor 51.

The bit compression convertor 51, for example, by a conversion characteristic as illustrated in FIG. 11A (in FIG. 11A, a four-sectional broken line approximation characteristic in which three sectional points are specified and intervals between these three sectional points are approximated by a straight line), compresses the pixel output of the G filter of each pixel output of the RGB filter which are extended to 14-bit data, to 12-bit data. In FIG. 11A, a dotted-line square "a" illustrates a range of 12-bit data, and a dash-dot line "b" illustrates a simple linear conversion characteristic in which data of the maximum value, 8190, is multiplied by ½.

In the conversion characteristic (bit compression conversion table) illustrated in FIG. 11A, the maximum value of the pixel output of the G filter is 8190, therefore 8190 is compressed so as to become 4095. And the bit compression convertor 51 converts the 14-bit data of the pixel outputs of the R and B filters converted from the 12-bit data without performing the conversion of the output level to the 12-bit data.

In the present embodiment as described above, as an example in a case where the pixel output of the G filter extended to the maximum value, 8190, is compressed to the maximum value, 4095, the conversion characteristic (a solid line in FIG. 11A) having the three sectional points as illustrated in FIG. 11A is used. In the present embodiment, the following two effects, which are not obtained by a simple non-sectional point linear conversion characteristic ("b" in FIG. 11A), are obtained.

As a first effect, more bit numbers are allocated to reliable data. That is, in a case where the compensating process is performed on the pixel output of the G filter which reaches the saturation level, the compensating process is performed on a range which is equal to or more than a prescribed value in the vicinity of the saturation level of the pixel output of the G filter, and the compensating process is not performed on a range which is equal to or less than this prescribed value. Therefore, the accuracy of the data is different in ranges on which the compensating process is performed and is not performed.

That is, in a case where the pixel output of the G filter which is saturated is compensated by the formulas (1) to (5), depending on a color of a main photographic subject, a brightness level of the photographic subject is not often reproduced accurately in a range where the compensating process is performed. On the other hand, in a range where the compensating process is not performed, data is actual data (an analog RGB image signal) that is outputted from the CCD 20 having the RGB filter and A/D converted. Therefore, this data is highly reliable.

That is, in the conversion characteristic (a solid-line in FIG. 11A) illustrated in FIG. 11A in the present embodiment, for example, when a value of input 14-bit data is 1024, a value of output 12-bit data is 1024, and this illustrates that former data (the input 14-bit data) is used. On the other hand, for example, when a value of input 14-bit data is 3072, a value of output 12-bit data is 2560, and in this range a bit allocation is smaller than a bit allocation before the compensating process, and thereby some bit errors occur.

Thus, the conversion characteristic (a solid-line in FIG. 11A) having the three sectional points as illustrated in FIG. 11A of the present embodiment is adopted, instead of the simple non-sectional point linear conversion characteristic (a dash-dot line "b" in FIG. 11A), so that the bit allocation can be gradually smaller, and more bit numbers can be allocated to the data which is highly reliable.

As a second effect, gradations in low and middle brightness are accurately saved. That is, in a case where a bit compression is performed by the simple non-sectional point linear conversion characteristic ("b" in FIG. 11A), an image where gradations have been lost is obtained. Accordingly, an image where the compensating process is not performed in a low brightness becomes an image where gradations have been lost. Therefore, an image where gradations have been lost may be obtained. On the other hand, in a case where the bit compression is performed by the conversion characteristic according to the present embodiment as illustrated in FIG. 11A, in a compression where the compensating process is not performed in the low brightness level, a compression rate so as to become an approximately same value before and after performing the bit compressions in the bit compression convertor 51 is used, so that the gradations in the low brightness level can be maintained favorably.

In the present embodiment, when the extended 14-bit data of the pixel output of the G filter is compressed to 12-bit data, as illustrated in FIG. 11A, the bit compression is performed by the four-sectional broken line approximation characteristic (conversion characteristic) in which the three sectional points are specified and the intervals between these three sectional points are approximated by the straight line; however the number of these sections is not limited especially. For example, a conversion characteristic may be a two-sectional broken line approximation characteristic in which one sectional point is specified, however the bit allocation is changed significantly in the vicinity of the sectional point, and thereby the two effects described above become smaller. Therefore, a broken line approximation characteristic (conversion characteristic) having the number of sections which is equal to or more than three sections is preferable.

In addition, the conversion characteristic in which the extended 14-bit data of the pixel output of the G filter is compressed to 12-bit data, as illustrated in FIG. 11B, may be a conversion characteristic (bit compression conversion table) by a curved line which does not have a plurality of sectional points. That is, the conversion characteristic by this curved line is a conversion characteristic having the number of sections of 8192, while the conversion characteristic illustrated in FIG. 11A is the conversion characteristic having the four sections. In FIG. 11B, a dotted-line square "a" illustrates a range of 12-bit data.

Additionally, a look-up table having numerical value data after compressing to 12-bit data is provided for values from 0 to 8192 of input 14-bit data, so that the extended 14-bit data of the pixel output of the G filter can be compressed favorably to 12-bit data by the conversion characteristic by this curved line.

Each pixel output data of the RGB filter converted from 14-bit data into 12-bit data in the bit compression convertor 51 is inputted to the white balance controller 52.

The white balance controller 52 multiplies the inputted pixel output data of the RGB filter by a compensation coefficient to adjust white balance. This compensation coefficient is calculated in the controlling section 28 based on the above AWB evaluation value produced in the sensor I/F 34. The compensation coefficient is a coefficient to properly adjust the white color of the light source.

Each pixel output data of the RGB filter (12-bit) in which the white balance is adjusted in the white balance controller 52 is inputted to the RGB data producer 53. The RGB data producer 53 performs an interpolation calculating process on RAW data which has only one color data for one pixel of Bayer arrangement, and produces all data of RGB for one pixel.

Figure 12:
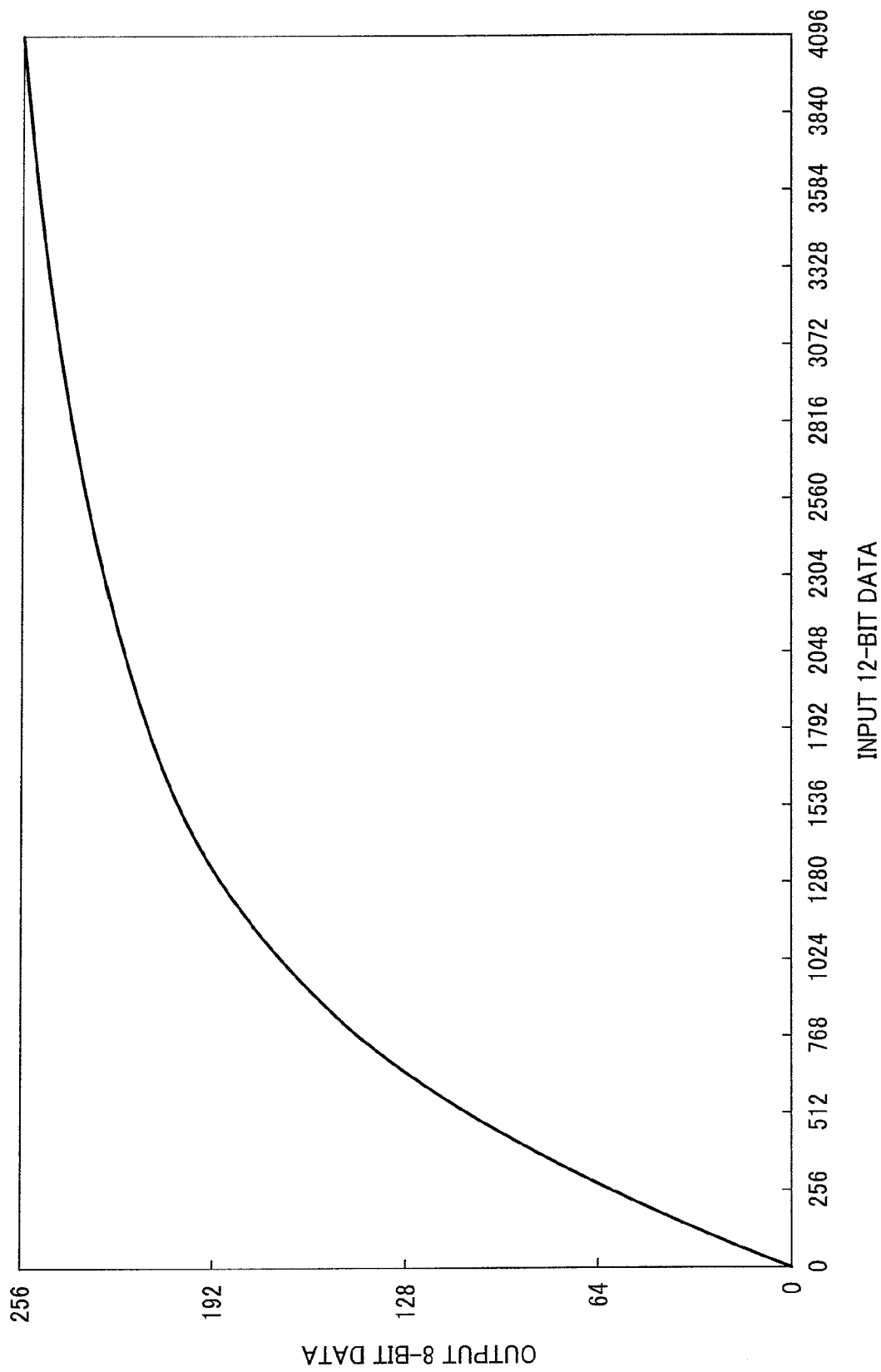
FIG. 12 illustrates an example of a conversion table which converts (γ-converts) 12-bit RGB data into 8-bit RGB data.

All the data (12-bit) of RGB which is produced in the RGB data producing section 53 is inputted to the tone curve convertor 54. The tone curve convertor 54 performs a γ conversion, which converts 12-bit RGB data into 8-bit RGB data, by a conversion table as illustrated in FIG. 12, and produces 8-bit RGB data, and then outputs the 8-bit RGB data to the RGB-YUV convertor 55.

The RGB-YUV convertor 55 converts the RGB data (8-bit) which is inputted to YUV data by a matrix calculation, and outputs the YUV data to the image size convertor 56. The image size convertor 56 performs a reduction or an expansion to a desired image size on the YUV data (8-bit) which is inputted, and outputs the YUV data on which the reduction or the expansion to the desired image size is performed to the brightness histogram producer 57 and the edge enhancer 58.

The brightness histogram producer 57 produces a brightness histogram by the YUV data which is inputted. The edge enhancer 58 performs an edge enhancing process and the like in accordance with an image on the YUV data which is inputted and stores the YUV data in the SDRAM 23 via the memory controller 35.

Thus, in the present embodiment, even when shooting where the pixel output of the G filter in the processing unit in which a sensitivity is high exceeds the saturation level, the pixel output of the G filter which is saturated is compensated on the basis of the pixel outputs of the R and B filters in which sensitivities are low. And thereby, as illustrated in FIG. 4, on the basis of a compensation area (dash-dot line parts of the pixel output of G filter of "d" and "e" in FIG. 4) where the pixel output of the G filter ("d" and "e" in FIG. 4) is compensated, the dynamic range can be expanded by 200% at one shooting.

Therefore, even in a case where there is a high-brightness part in a background and the like in a photographic subject image, it is possible to prevent whiteout from occurring and obtain favorable gradation characteristics.

In the above explanation of embodiment 1 and FIGS. 4 and 8, it is explained that the saturation level A in FIG. 4 which is a predetermined saturation level (judging level) value corresponds to a maximum value, which is 4095, of 12-bit data after compensating, and the saturation level TG in FIG. 8 corresponds to a maximum value, which is 4095, of 12-bit data after compensating; however a saturation level value is not limited to the above. For example, in the vicinity of a high brightness part where the output is completely saturated, in a CCD having an RGB filter in which a linearity of the output is not good, for example, a value of 4032, which is smaller than a value of 4095 which is the maximum value of 12-bit data and in which the output is completely saturated, is taken as a predetermined saturation level value (the saturation level A in FIG. 4), and a pixel output which exceeds the above value may be a subject of the compensating process.

In addition, depending on configurations of digital cameras, the saturation level value is less than a maximum value of the 12-bit data, which is 4095, even in a high-brightness photographic subject. Also in this case, the predetermined saturation level may be a smaller value than a value of 4095.

Thus, even when a predetermined saturation level is less than a value of 4095, a conversion curve illustrated in FIG. 12 is changed in accordance with a conversion characteristic, so that a value of the output of the bit compression convertor 51 can be 4095, and it is possible to expand the dynamic range without changing subsequent processes.

The digital camera 1 according to the present invention, by the above dynamic range expanding process, is capable of expanding the dynamic range by 200% at one shooting by performing the compensating process on the saturated pixel output of the G filter, and additionally has a following processing function.

As described above, the sensor I/F 34 of the signal processing section 22 has a function of calculating an average pixel output value (average output value) of each of the segments and a histogram (distribution) of the pixel output of G filter of each of the segments from inputted RAW-RGB data. And the controlling section 28 is capable of reading out the above average output value and the histogram of the pixel output if needed.

Figure 13A:
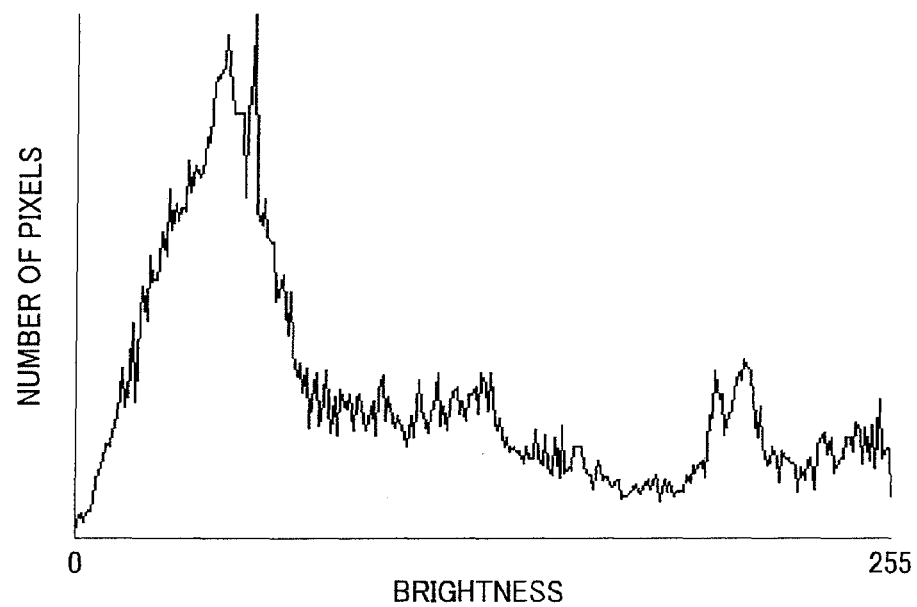
FIG. 13A illustrates an example of a histogram of the pixel output of the G filter.
Figure 13B:
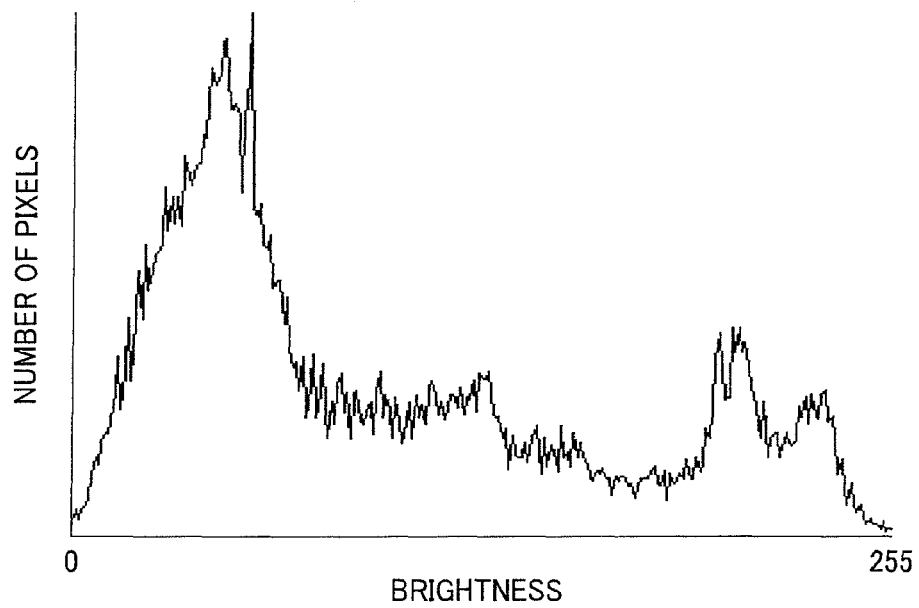
FIG. 13B illustrates another example of a histogram of the pixel output of the G filter.

FIGS. 13A and 13B respectively illustrate examples of histograms of the pixel output of the G filter in two arbitrary segment in equally-divided 1024 segments (32 horizontal segments and 32 vertical segments). In the histogram of FIG. 13A, there is a high-brightness photographic subject in the segments, and a part which is saturated (a maximum brightness part (255)). On the other hand, in the histogram of FIG.

13B, there is little high-brightness photographic subject which is saturated in the segments. The histograms of the pixel output of FIGS. 13A and 13B are calculated by the sensor I/F 34.

In a case where there is the high-brightness photographic subject in a vicinity of the maximum brightness part (255) as the histograms of the pixel output illustrated in FIG. 13A, in the segment, the pixel output of the G filter is expanded to equal to or more than the saturation level as "d" or "e" of FIG. 4 by the above formulas (1) to (5), and thereby it is possible to obtain an effect of the dynamic range expansion.

On the other hand, in a case where there is no high-brightness photographic subject in the vicinity of the maximum brightness part (255) as the histogram of the pixel output of FIG. 13B and there is no pixel which reaches a predetermined saturation level, in the segment, the effect of the dynamic range expansion is not obtained by the formulas (1) to (5). And in this case, if the bit compression as illustrated in FIG. 11A is performed on the pixel out put of the G filter as described above, the dynamic range is reduced, for example, input data in a vicinity of the value of 4095 is compressed to less than or equal to the value of 3000.

Consequently, in the present embodiment, a plurality of bit compression conversion tables are stored in the ROM 24 beforehand. And the controlling section 28 selects and reads out a suitable bit compression conversion table from the ROM 24 in accordance with the histogram (distribution) of the pixel output of the G filter in each segment read out from the sensor I/F 34, and the bit compression convertor 51, based on the read-out bit compression conversion table, performs the bit compression on the pixel output data of the G filter as described above.

The controlling section 28 may be configured to read out an average pixel output value (average output value) instead of the histogram of the pixel output from the sensor I/F 34. Likewise, in this case, the controlling section 28 selects and reads out a suitable bit compression conversion table from the ROM 24 in accordance with the average pixel output value (average output value) in each of the segments, and the bit compression convertor 51, based on the read-out bit compression conversion table, performs the bit compression on the pixel output data of the G filter as described above.

The read-out bit compression conversion table is set in the bit compression convertor 51. In the present embodiment, the bit compression convertor 51 is capable of setting each bit compression conversion table corresponding to a segment of 32×32 divided segments, and before starting the above-described YUV conversion process, the controlling section 28 is capable of selecting and setting the bit compression conversion table used for each divided segment beforehand.

Figure 14A:
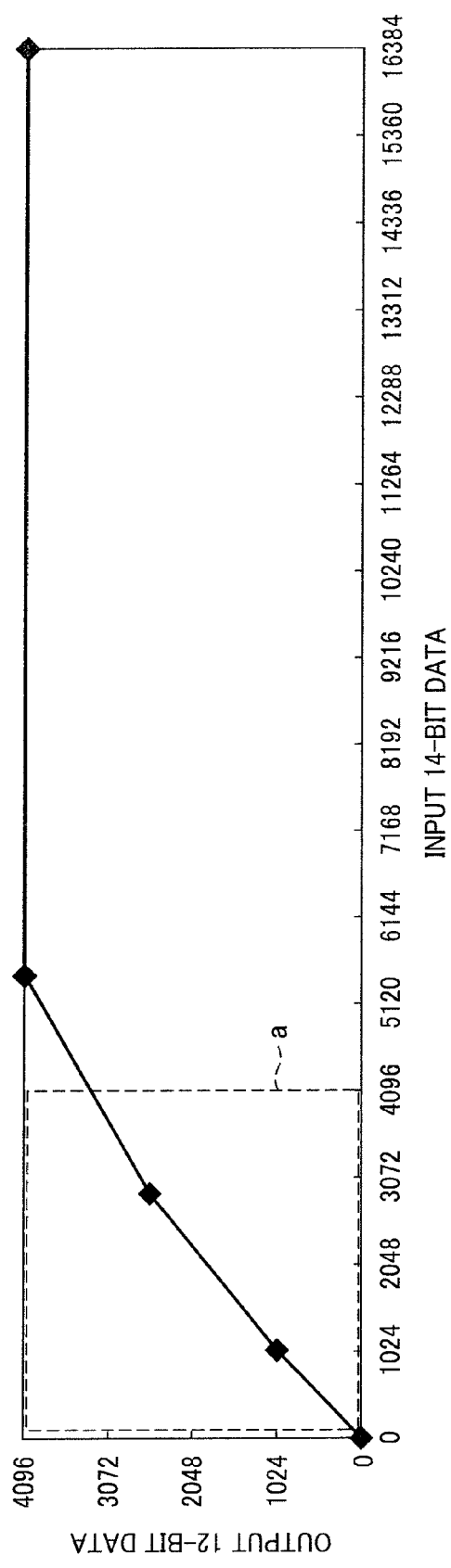
FIG. 14A illustrates an example of a bit compression conversion table.
Figure 14B:
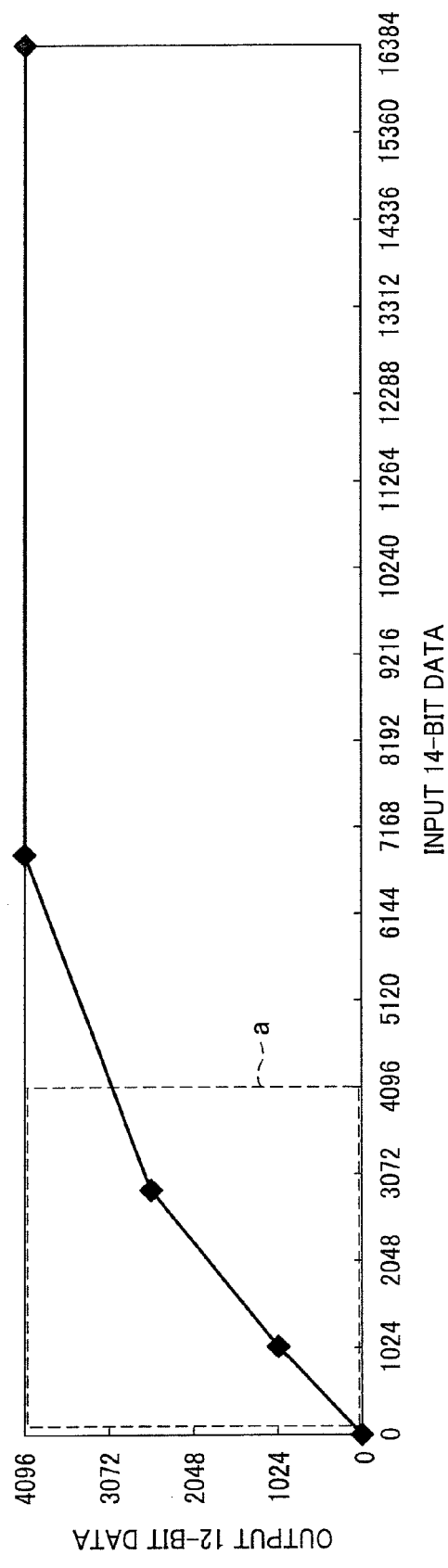
FIG. 14B illustrates another example of a bit compression conversion table.

In the ROM 24, for example, the bit compression conversion tables illustrated in FIGS. 11A and 11B respectively, and the bit compression conversion tables illustrated in FIGS. 14A and 14B respectively, are stored. A dotted-line square "a" illustrates a range of 12-bit data in FIGS. 14A and 14B.

In the present embodiment, for example, in a case where a predetermined saturation level is set to a value of 4000 of the input data which is less than or equal to a value of 4095 as described above, if there is much input data which is equal to or more than the value of 4000 and there is also input data which is equal to or more than the value of 4050, the bit compression conversion table illustrated in FIG. 11A is selected, and if there is input data which is equal to more than the value of 4000 but there is no input data which is less than or equal to the value of 4050, the bit compression conversion table illustrated in FIG. 14B is selected, and if there is no pixel output which reaches the predetermined saturation level, the bit compression conversion table illustrated in FIG. 14A is selected. A difference between the bit compression conversion tables illustrated in FIGS. 14A and 14B is a difference of numerical values of input data when whiteout occurs, and the bit compression conversion table illustrated in FIG. 14A has a higher possibility of increasing areas where whiteout occurs.

Thus, by selecting a suitable bit compression conversion table from the ROM 24 in accordance with the histogram (distribution) of the pixel output of the G filter in each segment read from the sensor I/F 34, in a case where there is no high-brightness photographic subject in a specific segment and there is no pixel output which reaches the predetermined saturation level, it is possible to make small a compensation amount for the pixel output of the G filter in the segment. Therefore, in a case where the pixel output is compensated to expand to equal to or more than the saturation level A as described above, for the segment where there is no high-brightness photographic subject and there is no pixel output which reaches the predetermined saturation level, it is possible to prevent from reducing the dynamic range.

In the present embodiment, as a bit compression conversion table, four kinds of bit compression conversion tables illustrated in FIGS. 11A, 11B, 14A, and 14B have been presented, however the bit compression conversion table is not limited to these four kinds of the bit compression conversion tables. For example, it is possible to use a bit compression conversion table suitable for a characteristic of a brightness distribution of each of the segments. In this case, if bit compression conversion tables having extremely different characteristics are set in neighboring segments, in a high-brightness part, a difference occurs in output brightness in regard to an input of the same brightness, and thereby there is a possibility of a coloring change. Therefore, a range of a settable bit compression conversion table characteristic are set beforehand, and, for example, a plurality of bit compression conversion tables are set beforehand.

Figure 15:
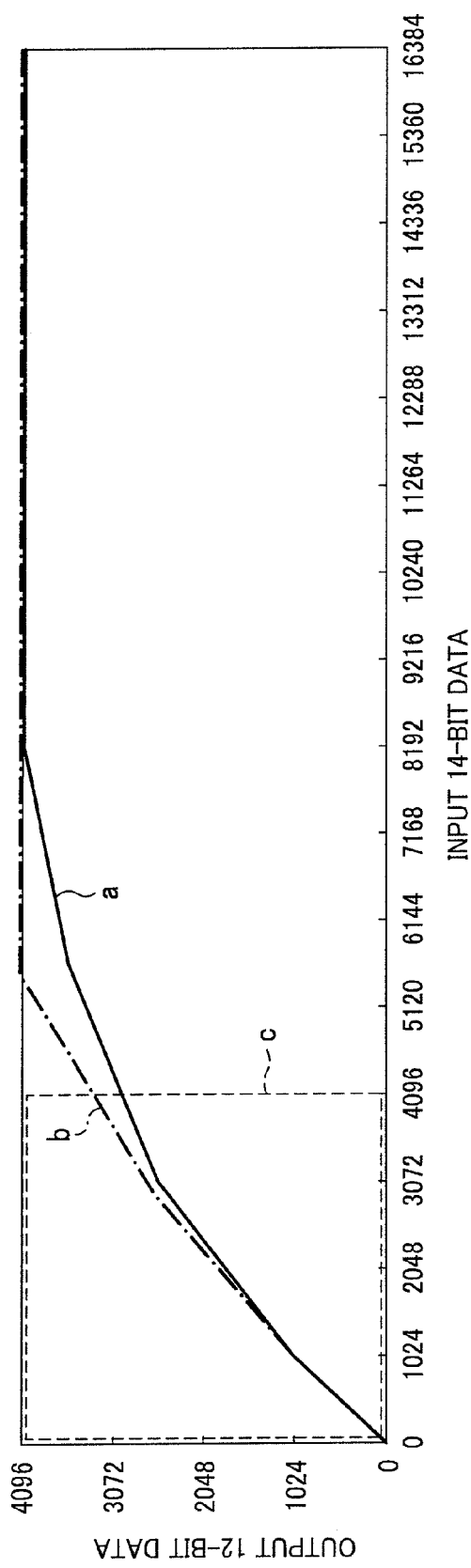
FIG. 15 illustrates an example of a bit compression conversion table in which a bit compression characteristic range is set.

In the present embodiment, for example, bit compression conversion tables (a solid line "a" and a dash-dot line "b") illustrated in FIG. 15 are set. In FIG. 15, the solid line "a" is a criterial bit compression conversion table calculated from an output characteristic of the CCD 20 having the RGB filter. The dash-dot line "b" is a bit compression conversion table which is settable to reduce an effect of the dynamic range expansion in accordance with the brightness distribution and the average brightness. In FIG. 15A, a dotted-line square "c" illustrates a range of 12-bit data.

Accordingly, by use of the bit compression conversion table illustrated in FIG. 15, in the neighboring segments, in the case where the effect of the dynamic range expansion is reduced in accordance with the brightness distribution and the average brightness, it is possible for a compensation amount to be in a predetermined range for the criterial bit compression conversion table, and therefore the brightness difference occurring in the output image is suppressed, and the coloring change is preventing.

[Embodiment 2]

Figure 16:
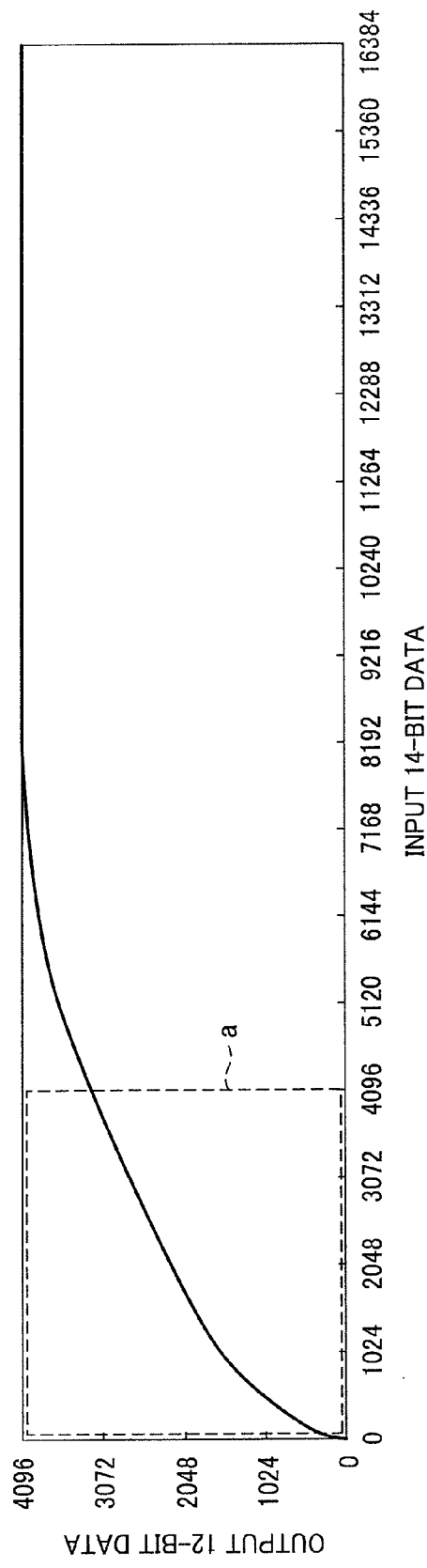
FIG. 16 illustrates an example of a bit compression conversion table used in embodiment 2 of the present invention.

In Embodiment 1, the four kinds of the bit compression conversion tables illustrated in FIGS. 11A, 11B, 14A, and 14B have been illustrated. In the present embodiment, in a case where a brightness distribution on a low-brightness side is observed and there is more pixel data in an area where blackout occurs, a bit compression conversion table as illustrated in FIG. 16 is used, for example. In FIG. 16, a dash-line square "a" illustrates a range of 12-bit data. Compared to the bit compression conversion table illustrated in FIG. 11B, in the bit compression table illustrated in FIG. 16, an output value on the low-brightness side is larger.

[Embodiment 3]

For example, in a case where an average brightness value in a segment in an upper part of an image plane is high and the histogram of the pixel output of the G filter is one-sided to the high-brightness side, the segment may possibly be the sky in fine weather. In a case of shooting a scenery with a clear sky as the above, when the above dynamic range expanding process is performed and then the bit compression is performed by use of the bit compression conversion table illustrated in FIG. 11A, there is a possibility of darkening a clear sky part for the following reason.

That is, in a case of an ordinary shooting mode where the above dynamic range expanding process is not performed, the pixel output is a range of 12-bit data (0 to 4095) (a range of a dash-line square "a"), an area where a value is equal to or more than 4095 is an area where the pixel output exceeds the saturation level and the whiteout occurs. And by performing the dynamic range expanding process described in Embodiment 1 of the present invention, a favorable gradation is obtained also in the above area where the whiteout occurs. In Embodiment 1, in a case where the pixel output exceeds 4095 as illustrated in FIG. 11A, a part in a range of 8190 calculated by the compensating process is allocated to the range of 4095 by the bit compression again. That is, in this case, a bit compression with a higher compression rate is performed on the high-brightness side.

Therefore, in the bit compression conversion table as illustrated in FIG. 11A, if there exists a high-brightness part where a value is equal to or more than 3000 of input data, any output data become smaller values than original numerical values (numerical values of the input data). That is, in a case where the bit compression is performed by use of the bit compression conversion table illustrated in FIG. 11A, for example, if the high-brightness part where a value is equal to or more than 3000 of input data is "a clear sky in fine weather", a part of the clear sky in fine weather is darkened.

Therefore, in the present embodiment, in a case where the average brightness value in the segment is high and the histogram of the pixel output of the G filter is one-sided to the high-brightness side, the above dynamic range expanding process is performed and then the bit compression is performed by use of the bit compression conversion tables illustrated in FIGS. 14A and 14B, instead of by use of the bit compression conversion table illustrated in FIG. 11A, and thereby darkening the part of the clear sky in fine weather is prevented, and a more natural effect of the dynamic range expansion is obtained.

[Embodiment 4]

Embodiment 1 is an example of performing the compensating process of the pixel output of the G filter, in a case where the pixel output of the G filter reaches the saturation level and at least one of pixel outputs of the R and B filters reaches the predetermined output level. In the present embodiment, only when the pixel output of the G filter is saturated is the compensating process of the pixel output of the G filter by the D range expansion compensating section 50 (see FIG. 6) performed.

In the present embodiment, in the pixel output compensation processor 61 of the D range expansion compensator 50, as illustrated in the following Number 2 (formulas (6)), a compensating process is performed only when the pixel output of the G filter reaches a predetermined saturation level.

[Number 2]

If Go<TG: Ge=Go

If Go=TG: $Ge = K \times Go$     formulas (6)

Here, Ge is a pixel output of the G filter after the compensating process, Go is a pixel output of the G filter before the compensating process, K is a compensation coefficient, and TG is a saturation level (judging level) of a pixel output of the G filter.

Thus, by performing the compensating process by the formulas (6), it is possible to compensate the pixel output of the G filter, for example, even in a case where depending on a coloring of a photographic subject, only pixel outputs of the R and B filters are large and a proportion of each pixel output of the RGB filter is extremely deviated from the proportion as illustrated in FIG. 8.

[Embodiment 5]

In embodiment 1, as illustrated in FIG. 3, for the CCD 20 having the RGB filter, 2×2 pixels are taken as the processing unit (minimum unit). However, in the present embodiment, as illustrated in FIG. 17, a processing unit (minimum unit) includes five pixels in a bold-line frame A (one pixel of the G filter, two pixels of the R filter (R1 and R2) and two pixels of the B filter (B1 and B2)), and the processing unit of the present embodiment has a wider range than the processing unit of embodiment 1. In embodiment 5, a configuration of a digital camera, a monitoring operation, a still image shooting operation, and a dynamic range expanding process are similar to embodiment 1.

In a case where the pixel output of the G filter which is in the processing unit of the bold-line frame A illustrated in FIG. 17 reaches the saturation level, a sensitivity of the G filter is approximately twice as high as the sensitivities of the R and B filters as described above, and a compensation coefficient of a pixel output of the G filter (K) and a pixel output of the G filter after compensation (Ge) are calculated by the formulas (7) and (8) below.

$$K = \{l \times f(Ra) + m \times f(Ga) + n \times f(Ba)\}/3 \qquad \text{formula (7)}$$

$$Ge = K \times Ga \qquad \text{formula (8)}$$

l, m, and n are coefficients which are set based on sensitivity rates of each filter of the RGB filter, and Ga is a pixel output of the G filter before compensation. And f(Ra), f(Ga), f(Ba) are coefficients which are set by Number 3 (formulas (9) to (11)) below.

[Number 3]

If Ra≦TR: f(Ra)=1

If Ra>TR: $f(Ra) = Ra/TR$     formulas (9)

If Ga<TG: f(Ga)=1

If Ga=TG: $f(Ga) = Ga/TG$     formulas (10)

If Ba≦TB: f(Ba)=1

If Ba>TB: $f(Ba) = Ba/TB$     formulas (11)

Ra is an average value of the pixel output of the R filter in the processing unit (see FIG. 17), TR is a predetermined output level (judging level) of the pixel output of the R filter, Ga is a pixel output of the G filter in the processing unit (see FIG. 17), TG is a saturation level (judging level) of the pixel output of the G filter, Ba is an average value of the pixel output of the B filter in the processing unit (see FIG. 17) and TB is a predetermined output level (judging level) of the pixel output of the B filter.

TR, TG, and TB in the formulas (9) to (11) are similar to those in the formulas (3) to (5). And as for coefficients l, m and n, if sensitivity rates of each pixel output of the RGB filter are similar to those in embodiment 1, the coefficients l and n are 3/2 respectively, and the coefficient m is 0.

The pixel output compensation processor 61 of the D range expansion compensator 50 illustrated in FIG. 6 replaces a pixel output value of the G filter which is calculated by the formula (8) as a pixel output value of the G filter which is in the processing unit described above (see FIG. 17). Hereinafter, a similar process to embodiment 1 is performed.

Thus, by widening the processing unit, an influence by a sensitivity difference which pixels of the R1 and R2 filters and pixels of the B1 and B2 filters in the processing unit have is moderated. Therefore, it is possible to perform a more accurate dynamic range expansion compensation on the pixel output of the G filter.

[Embodiment 6]

In the present embodiment, as illustrated in FIG. 18, a processing unit (a bold-line frame A) is further widened than in a case of embodiment 5, for the CCD 20 having the RGB filter. In embodiment 6, a configuration of a digital camera, a monitoring operation, a still image shooting operation, and a dynamic range expanding process are similar to embodiment 1. The formulas (7) to (11) are used as calculation formulas of the compensation for the pixel output of the G filter as well as embodiment 5.

If the processing unit is widened, the dynamic range expansion compensating process is performed on the basis of brightness information in a wider range, and this is equivalent to applying a low-pass filter. Accordingly, an edge part of brightness variation may become dull. Therefore, in the present embodiment, a size of a wider processing unit is partially changed by use of the AF evaluation value, for example.

That is, in the sensor I/F 34 of the signal processing section 22 illustrated in FIG. 2, the AF evaluation value to perform the AF is calculated as described above. The AF evaluation value is equivalent to a so-called output of a high-pass filter (HPF), and a larger value is outputted in a part where there is brightness variation in an image plane of a photographic subject image. The controlling section 28 reads out an AF evaluation value when shooting a still image and judges a part where there is brightness variation in the image plane and a part where there is no brightness variation in the image plane.

And the controlling section 28 controls the D range expansion compensator 50 to set to narrow the processing unit in the part where there is brightness variation and to set to widen the processing unit in the part where there is no brightness variation as illustrated in FIG. 18, on the basis of this judging data.

Thus, even in a case where the processing unit is further widened, a setting to narrow the processing unit in the part where there is brightness variation is performed, and thereby it is possible to perform an accurate dynamic range expansion compensation without reducing a resolution.

In each of the above embodiments, a configuration where three primary color filters of RGB (Red, Green and Blue) as color separation filters are placed is used. However, even in a configuration where complementary color filters as the color separation filters are placed, the present invention is applicable as well.

In addition, in each of the above embodiments, an explanation regarding an imaging apparatus such as a digital camera having a photographing lens system and a solid-state image sensor such as a CCD has been explained. However, the present invention is also applicable to an image processor. For example, the present invention is also applicable to an image processor such that image data is outputted based on an analog signal outputted from an image sensor.

According to an embodiment of the present invention, it is possible to expand a dynamic range at one shooting, without using a specific sensor or without a plurality of shootings with various exposures and an image composition In addition, according to an embodiment of the present invention, it is possible to obtain an effect of a more natural dynamic expansion by preventing an area which is supposed to be bright, for example, a clear sky in fine weather and so on, from darkening.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus, comprising:
an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of the each of the pixels and images an image of the photographic subject;
a pixel output judging processor which judges if each pixel output reaches each predetermined judging level or not;
a pixel output compensation processor, wherein in a case where at least one of a pixel output of a pixel on which a specific color filter is placed of the pixels and a pixel output of a pixel on which a color filter other than the specific color filter is placed of the pixels in the vicinity of the pixel on which the specific color filter is placed is judged to reach a predetermined judging level by the pixel output judging processor, which compensates the pixel output of the pixel on which the specific color filter is placed; and
a bit compression convertor which performs a bit compression such that pixel output data outputted from the pixel output compensation processor which is once converted from a first bit number into a second bit number larger than the first bit number is converted again into the first bit number,
wherein the bit compression convertor, based on a bit compression characteristic set in each of segments that an image plane corresponding to the light receiving surface of the image sensor is plurally divided in the vertical and horizontal directions, performs the bit compression on the pixel output data in each of the segments.

2. The imaging apparatus according to claim 1, wherein when the pixel output of the pixel on which the color filter other than the specific color filter is placed in the vicinity of the pixel on which the specific color filter is placed reaches a predetermined output level, the pixel output compensation processor compensates the pixel output of the pixel on which the specific color filter is placed based on the pixel output of the pixel on which the color filter other than the specific color filter is placed in the vicinity of the pixel on which the specific color filter is placed.

3. The imaging apparatus according to claim 1, wherein when the pixel output of the pixel on which the specific color filter is placed reaches a predetermined saturation level, the pixel output compensation processor compensates the pixel output of the pixel on which the specific color filter is placed based on the pixel output of the pixel on which the color filter other than the specific color filter is placed based on the pixel output of the pixel on which the color filter other than the specific color filter is placed in the vicinity of the pixel on which the specific color filter is placed.

4. The imaging apparatus according to claim 2, further comprising:
a pixel output distribution calculator which calculates a pixel output distribution in each of the segments, wherein
the bit compression convertor performs the bit compression on the pixel output data in each of the segments based on a bit compression characteristic respectively set in accordance with the pixel output distribution in each of the segments calculated by the pixel output distribution calculator.

5. The imaging apparatus according to claim 3, further comprising:
a pixel output distribution calculator which calculates a pixel output distribution in each of the segments, wherein
the bit compression convertor performs the bit compression on the pixel output data in each of the segments based on a bit compression characteristic respectively set in accordance with the pixel output distribution in each of the segments calculated by the pixel output distribution calculator.

6. The imaging apparatus according to claim 2, further comprising:
an average pixel output value calculator which calculates an average pixel output value in each of the segments, wherein
the bit compression convertor performs the bit compression on the pixel output data in each of the segments based on a bit compression characteristic respectively set in accordance with the average pixel output value in each of the segments calculated by the average pixel output value calculator.

7. The imaging apparatus according to claim 3, further comprising:
an average pixel output value calculator which calculates an average pixel output value in each of the segments, wherein
the bit compression convertor performs the bit compression on the pixel output data in each of the segments based on a bit compression characteristic respectively set in accordance with the average pixel output value in each of the segments calculated by the average pixel output value calculator.

8. The imaging apparatus according to claim 1, wherein the bit compression characteristic is set to be in a predetermined characteristic range for a criterial bit compression characteristic.

9. An imaging method of an imaging apparatus including an image sensor having a light receiving surface with a plurality of pixels and a color separation filter of a plurality of colors on a front side of each of the pixels, which receives light incident from a photographic subject via an optical system on the light receiving surface via the color separation filter and outputs as a pixel output of the each of the pixels and images an image of the photographic subject, comprising:
a pixel output judging processing step which judges if each pixel output reaches each predetermined judging level or not;
a pixel output compensation processing step, wherein in a case where at least one of a pixel output of a pixel on which a specific color filter is placed of the pixels and a pixel output of a pixel on which a color filter other than the specific color filter is placed of the pixels in the vicinity of the pixel on which the specific color filter is placed are judged to reach a predetermined judging level by the pixel output judging processing step, which compensates the pixel output of the pixel on which the specific color filter is placed; and
a bit compression converting step which performs a bit compression such that pixel output data outputted from the pixel output compensation processor which is once converted from a first bit number into a second bit number larger than the first bit number is converted again into the first bit number,
wherein the bit compression converting step, based on a bit compression characteristic set in each of segments that an image plane corresponding to the light receiving surface of the image sensor is plurally divided in the vertical and horizontal directions, performs the bit compression on the pixel output data in each of the segments.

10. The imaging method according to claim 9, wherein when the pixel output of the pixel on which the color filter other than the specific color filter is placed in the vicinity of the pixel on which the specific color filter is placed reaches a predetermined output level, the pixel output compensation processing step compensates the pixel output of the pixel on which the specific color filter is placed based on the pixel output of the pixel on which the color filter other than the specific color filter is placed in the vicinity of the pixel on which the specific color filter is placed.

11. The imaging method according to claim 9, wherein when the pixel output of the pixel on which the specific color filter is placed reaches a predetermined saturation level, the pixel output compensation processing step compensates the pixel output of the pixel on which the specific color filter is placed based on the pixel output of the pixel on which the color filter other than the specific color filter is placed in the vicinity of the pixel on which the specific color filter is placed.

12. The imaging method according to claim 10, further comprising:
a pixel output distribution calculating step which calculates a pixel output distribution in each of the segments, wherein
the bit compression converting step performs the bit compression on the pixel output data in each of the segments based on a bit compression characteristic respectively set in accordance with the pixel output distribution in each of the segments calculated by the pixel output distribution calculating step.

13. The imaging method according to claim 11, further comprising:
a pixel output distribution calculating step which calculates a pixel output distribution in each of the segments, wherein
the bit compression converting step performs the bit compression on the pixel output data in each of the segments based on a bit compression characteristic respectively set in accordance with the pixel output distribution in each of the segments calculated by the pixel output distribution calculating step.

14. The imaging method according to claim 10, further comprising:
an average pixel output value calculating step which calculates an average pixel output value in each of the segments, wherein
the bit compression converting step performs the bit compression on the pixel output data in each of the segments based on a bit compression characteristic respectively set in accordance with the average pixel output value in each of the segments calculated by the average pixel output value calculating step.

15. The imaging method according to claim 11, further comprising:
- an average pixel output value calculating step which calculates an average pixel output value in each of the segments, wherein
- the bit compression converting step performs the bit compression on the pixel output data in each of the segments based on a bit compression characteristic respectively set in accordance with the average pixel output value in each of the segments calculated by the average pixel output value calculating step.

16. The imaging method according to claim 9, wherein the bit compression characteristic is set to be in a predetermined characteristic range for a criterial bit compression characteristic.

* * * * *